(12) United States Patent
Baker

(10) Patent No.: US 11,810,007 B2
(45) Date of Patent: Nov. 7, 2023

(54) SELF-BUILDING HIERARCHICALLY INDEXED MULTIMEDIA DATABASE

(71) Applicant: VideoXRM Inc., Las Vegas, NV (US)

(72) Inventor: David N. Baker, Las Vegas, NV (US)

(73) Assignee: VideoXRM Inc., Las Vegas, NV (US)

(*) Notice: Subject to any disclaimer, the term of this patent is extended or adjusted under 35 U.S.C. 154(b) by 0 days.

(21) Appl. No.: 17/645,407

(22) Filed: Dec. 21, 2021

(65) Prior Publication Data
US 2022/0147846 A1    May 12, 2022

Related U.S. Application Data

(63) Continuation of application No. 17/198,158, filed on Mar. 10, 2021, now Pat. No. 11,210,596.

(60) Provisional application No. 63/110,540, filed on Nov. 6, 2020.

(51) Int. Cl.
| | |
|---|---|
| *G06F 7/00* | (2006.01) |
| *G06N 5/04* | (2023.01) |
| *G06N 20/00* | (2019.01) |
| *G06F 16/45* | (2019.01) |
| *G06F 16/41* | (2019.01) |

(52) U.S. Cl.
CPC .............. *G06N 5/04* (2013.01); *G06F 16/41* (2019.01); *G06F 16/45* (2019.01); *G06N 20/00* (2019.01)

(58) Field of Classification Search
CPC .......... G06N 5/04; G06N 20/00; G06F 16/45; G06F 16/41
USPC ..................... 707/600–899; 706/12
See application file for complete search history.

(56) References Cited

U.S. PATENT DOCUMENTS

| | | |
|---|---|---|
| 7,269,590 B2 | 9/2007 | Hull et al. |
| 7,275,061 B1 | 9/2007 | Kon et al. |
| 7,469,257 B2 | 12/2008 | Parlin et al. |
| 7,707,127 B2 | 4/2010 | Jhala et al. |

(Continued)

FOREIGN PATENT DOCUMENTS

| | | |
|---|---|---|
| AU | 4240800 A | 11/2000 |
| CN | 107710247 A | 2/2018 |

(Continued)

OTHER PUBLICATIONS

Iknowit, "Search Less Know More", Investor Deck, Crypto Jun. 11, 2021, Jun. 11, 2021, 14 pp.

*Primary Examiner* — Isaac M Woo
(74) *Attorney, Agent, or Firm* — Perkins Coie LLP; Michael Glenn; Vikram Iyengar

(57) ABSTRACT

Methods, apparatus, and systems for a self-building hierarchically indexed multimedia database are disclosed. The database includes multiple branches categorizing industries. Each branch supports at least one node tree associated with at least one issuer entity and stores multimedia content associated with the at least one issuer entity. A first pattern is extracted from a first node tree supported by a first branch using a machine learning module trained based on the database. A second pattern is extracted from a second node tree supported by a second branch. The first node tree includes at least one node more than the second node tree. It is determined that the first pattern matches the second pattern using the machine learning module. The machine learning module is trained to compare two patterns extracted from the database. A new node corresponding to the at least one node is incorporated within the second node tree.

15 Claims, 12 Drawing Sheets

(56) References Cited

U.S. PATENT DOCUMENTS

| | | |
|---|---|---|
| 7,720,799 B2 | 5/2010 | Kon et al. |
| 7,885,901 B2 | 2/2011 | Hull et al. |
| 7,958,153 B2 | 6/2011 | Kon et al. |
| 8,060,495 B2 | 11/2011 | Beavin et al. |
| 8,166,069 B2 | 4/2012 | Sample et al. |
| 8,185,524 B2 | 5/2012 | Weber et al. |
| 8,255,273 B2 | 8/2012 | Lv et al. |
| 8,266,148 B2 | 9/2012 | Guha et al. |
| 8,275,722 B2 | 9/2012 | Jhala et al. |
| 8,434,027 B2 | 4/2013 | Jones |
| 8,484,245 B2 | 7/2013 | Ha-Thuc et al. |
| 8,554,775 B2 | 10/2013 | Kon et al. |
| 8,688,535 B2 | 4/2014 | Yuan |
| 8,788,492 B2 | 7/2014 | Lu et al. |
| 8,812,559 B2 | 8/2014 | Kon et al. |
| 8,948,515 B2 | 2/2015 | Boiman et al. |
| 9,171,289 B2 | 10/2015 | Kraft et al. |
| 9,189,137 B2 | 11/2015 | Boiman et al. |
| 9,262,513 B2 | 2/2016 | Liu |
| 9,460,451 B2 | 10/2016 | Ruiz et al. |
| 9,524,752 B2 | 12/2016 | Rav-Acha et al. |
| 9,569,100 B2 | 2/2017 | Rav-Acha et al. |
| 9,570,107 B2 | 2/2017 | Boiman et al. |
| 9,690,846 B2 | 6/2017 | Zeng et al. |
| 9,734,869 B2 | 8/2017 | Rav-Acha et al. |
| 9,852,187 B2 | 12/2017 | Lu et al. |
| 10,013,706 B2 | 7/2018 | De Sa Resende et al. |
| 10,062,054 B2 | 8/2018 | Hull et al. |
| 10,395,321 B2 | 8/2019 | Shalita et al. |
| 10,630,791 B2 | 4/2020 | Baldwin et al. |
| 10,657,379 B2 | 5/2020 | Rav-Acha et al. |
| 10,706,442 B2 | 7/2020 | Feng et al. |
| 10,867,635 B2 | 12/2020 | Rav-Acha et al. |
| 10,909,569 B1 | 2/2021 | Shah et al. |
| 2002/0087566 A1 | 7/2002 | McAleer, III et al. |
| 2002/0099561 A1 | 7/2002 | Wilkins et al. |
| 2003/0004742 A1 | 1/2003 | Palmer et al. |
| 2005/0171884 A1 | 8/2005 | Arnott |
| 2005/0216861 A1 | 9/2005 | Hurewitz et al. |
| 2007/0174167 A1 | 7/2007 | Natella et al. |
| 2008/0127270 A1 | 5/2008 | Shipman et al. |
| 2009/0077059 A1 | 3/2009 | Torres et al. |
| 2010/0306197 A1 | 12/2010 | Jin et al. |
| 2013/0097148 A1 | 4/2013 | Kon et al. |
| 2018/0018371 A1 | 1/2018 | Miller et al. |
| 2018/0329935 A1* | 11/2018 | Mugali ............... G06F 16/25 |
| 2018/0365289 A1 | 12/2018 | Brown et al. |
| 2019/0188561 A1 | 6/2019 | Tang et al. |
| 2020/0142932 A1 | 5/2020 | Hazra et al. |
| 2020/0372255 A1 | 11/2020 | Fleisher |
| 2021/0117471 A1 | 4/2021 | Rav-Acha et al. |

FOREIGN PATENT DOCUMENTS

| | | |
|---|---|---|
| CN | 105431834 B | 10/2018 |
| CN | 105843703 B | 1/2019 |
| CN | 105760417 B | 10/2019 |
| CN | 111279334 A | 6/2020 |
| CN | 106688215 B | 7/2020 |
| CN | 112214980 A | 1/2021 |
| CN | 112559678 A | 3/2021 |
| DE | 112019003431 T5 | 3/2021 |
| JP | 5572596 B2 | 7/2014 |
| JP | 6019232 B2 | 10/2016 |
| JP | 6301958 B2 | 3/2018 |
| JP | 6505200 B2 | 4/2019 |
| JP | 2020522788 A | 7/2020 |
| JP | 2021504785 A | 2/2021 |
| KR | 20080087591 A | 10/2008 |
| KR | 100904098 B1 | 6/2009 |
| KR | 101018987 B1 | 3/2011 |
| KR | 101674089 B1 | 11/2016 |
| KR | 101709790 B1 | 3/2017 |
| KR | 101908099 B1 | 12/2018 |
| KR | 102066330 B1 | 1/2020 |
| KR | 102073352 B1 | 2/2020 |
| WO | 0062198 A2 | 10/2000 |
| WO | 2006102841 A1 | 10/2006 |
| WO | 2010037003 A1 | 4/2010 |
| WO | 2010081255 A1 | 7/2010 |
| WO | 2014028181 A1 | 2/2014 |
| WO | 2014110141 A2 | 7/2014 |
| WO | 2019102309 A1 | 5/2019 |
| WO | 2021021627 A1 | 2/2021 |

* cited by examiner

Industry Management

Home / Industry Management

List

Show [10 ▼] entries        Search: [    ]      [Add Industry]

| Code ↑↓ | Description ↑↓ | Status ↑↓ | Action |
|---|---|---|---|
| 01 | Archived: Aerospace/Defense | Active | [Edit Industry Name] [Node Tree] [Duplicate] |
| 02 | Farming | Active | [Edit Industry Name] [Node Tree] [Duplicate] |
| 03 | Automobiles | Active | [Edit Industry Name] [Node Tree] [Duplicate] |
| 04 | Computers | Active | [Edit Industry Name] [Node Tree] [Duplicate] |
| 05 | Aerospace/Defense | Active | [Edit Industry Name] [Node Tree] [Duplicate] |
| 07 | Space | Active | [Edit Industry Name] [Node Tree] [Duplicate] |
| 09 | Health Care | Active | [Edit Industry Name] [Node Tree] [Duplicate] |
| 10 | Medical Devices | Active | [Edit Industry Name] [Node Tree] [Duplicate] |

Showing 1 to 8 of 8 entries      Previous 1 Next

Sidebar: Dashboard | ● Industry | Archived Industries | Node Data Snapshot | User Management | Logout

ISSUER PIXEL PROPRIETARY AND CONFIDENTIAL

PROFILE QUESTIONNAIRE

*Please answer as many questions as you can. The more questions you answer, the more visibility your company will have to investors.*

Company Name
[Enter Company Name] (Free text input)

Entity Type – Organizational Structure
[Select Below] (Drop down input)

Name of Individual Completing the Questionnaire
[Enter Name] (Free text input)

Email Address of Individual Completing the Questionnaire
[Enter Email] (Free text input)

URL for Company's Sales Department
[Enter Email] (Free text input)

Email Address of Sales Department
[Enter Email] (Free text input)

Phone Number for Product/Service Sales/Business Development Department?
[Enter Email] (Free text input)

URL for Company's Investor Relations Department
[Enter Email] (Free text input)

Email Address of Company's Investor Relations Contact
[Enter Email] (Free text input)

ISSUER PIXEL PROPRIETARY AND CONFIDENTIAL

VIDEO UPLOAD QUESTIONNAIRE

*Please answer as many questions as you can. The more questions you answer, the more visibility your company will have to investors.*

Categorize Video - Insert Video into Industry Hierarchy

\*Categories must be populated with information

\*Industry
[Select from Drop Down]

\*Sector
[Select from Drop Down]

\*Sub Sector
[Select from Drop Down]

\*Group
[Select from Drop Down]

\*Sub Group
[Select from Drop Down]

\*Echelon
[Select from Drop Down]

\*Sub Echelon
[Select from Drop Down]

Tier
[Select from Drop Down]

Sub Tier
[Select from Drop Down]

Video Title
[Type in Video Title]   (Free text input)

SELF-BUILDING HIERARCHICALLY INDEXED MULTIMEDIA DATABASE

CROSS-REFERENCE TO RELATED APPLICATION

This application is a continuation of U.S. patent application Ser. No. 17/198,158, filed Mar. 10, 2021, now issued U.S. Pat. No. 11,210,596, which claims the benefit of U.S. Provisional Patent Application No. 63/110,540, filed Nov. 6, 2020, which are all incorporated by reference in their entireties herein.

FIELD OF THE INVENTION

This description relates generally to multimedia databases and specifically to self-building hierarchically indexed multimedia databases.

BACKGROUND

A product and service-hierarchy database can organize comparable industry, sector, subsector, and group market performance and stock investment information centered around products produced and services performed by each company and its competitors, with each product or service type created as an index. Such product hierarchy enables the creation of an index for each product or service type that can be valued and measured. The product hierarchy database organizes and tracks company market performance and stock investment information by the products and services produced and offered by each competitor.

The product hierarchy is created in the database independently of the companies. The companies that produce each product are relationally linked to each product in the hierarchy that corresponds to a product produced or service performed by each company. An investment information service includes the product hierarchy database and makes it accessible to investor and analyst subscribers through a query system across the Internet. Data entry personnel load qualitative and quantitative information about companies and their products through a product hierarchy generator connected to the product hierarchy database. Subscribers can punch-through to query individual data items, and they can find out what relationships exist between important aspects of the companies and the products being tracked. Such a database also provides performance criteria by industry, sector, sub-sector, and group, thereby allowing industry, sector, sub-sector, and group-based qualitative assessment.

SUMMARY

Methods, apparatus, and systems for self-building hierarchically indexed multimedia databases are disclosed. In some embodiments, a computer system traverses a hierarchically indexed multimedia database that includes multiple branches categorizing multiple industries. Each branch of the hierarchically indexed multimedia database supports at least one node tree associated with at least one issuer entity. The node tree stores multimedia content associated with multiple issuer entities. The computer system extracts a first pattern from a first node tree supported by a first branch of the hierarchically indexed multimedia database using a machine learning module. The machine learning module is trained based on the hierarchically indexed multimedia database. The computer system extracts a second pattern from a second node tree supported by a second branch of the hierarchically indexed multimedia database using the machine learning module. The first node tree includes at least one node more than the second node tree. The computer system determines that the first pattern matches the second pattern using the machine learning module. The machine learning module is trained to compare two patterns extracted from the hierarchically indexed multimedia database. Responsive to determining that the first pattern matches the second pattern, the computer system incorporates a new node within the second node tree in accordance with the first pattern.

In some embodiments, a computer system receives a request to modify a node of a hierarchically indexed multimedia database categorizing multiple issuer entities. The hierarchically indexed multimedia database includes at least one branch associated with a respective industry and supports a node tree including the node to be modified. The computer system extracts features indicative of a priority of the request. The features are extracted from the request, other requests received to modify the node, and a structure of the hierarchically indexed multimedia database. The computer system determines the priority of the request based on the features using a machine learning module. The machine learning module is trained based on the structure of the hierarchically indexed multimedia database and the other requests. The computer system positions the request within the other requests based on the priority. The computer system modifies the node tree with respect to the structure of the hierarchically indexed multimedia database.

In some embodiments, the computer system generates a hierarchically indexed multimedia database categorizing multiple issuer entities. The hierarchically indexed multimedia database includes at least one branch associated with a respective industry. The branch supports at least one node. The computer system extracts metadata, using a machine learning module, from multimedia content received from an issuer entity. The computer system identifies the node, using the machine learning module, based on the metadata. The computer system stores the multimedia content at the node, such that the multimedia content is associated with the respective industry and the issuer entity.

In some embodiments, a computer system receives multimedia content from a particular issuer entity. Multiple issuer entities are categorized by a hierarchically indexed multimedia database stored by a multimedia content host. The hierarchically indexed multimedia database includes at least one node referencing the particular issuer entity. The computer system mines at least one analytics website using a machine learning module to identify a change in a rating of the particular issuer entity. The computer system traverses the hierarchically indexed multimedia database using the machine learning module based on the multimedia content to identify the node. The computer system transmits the multimedia content and the change in the rating of the particular issuer entity to the multimedia content host for storage at the node. The computer system receives a universal resource locator (URL) from the multimedia content host referencing the multimedia content. In response to receiving a combinatorial query from an investor entity requesting the multimedia content, the computer system displays the multimedia content and the change in the rating of the particular issuer entity.

In some embodiments, a computer system determines a first metric quantifying user engagement with multimedia content stored at a node of a hierarchically indexed multimedia database. The multimedia content and the node are each associated with an issuer entity. The computer system determines a second metric quantifying social media engagement, communication network activity, a trading volume, and a stock value associated with the issuer entity. The computer system determines a multidimensional correlation of the first metric to the second metric. The computer system ranks the issuer entity among the multiple issuer entities based on the multidimensional correlation. The computer system updates the node to include data describing a rank of the issuer entity among the multiple issuer entities.

In some embodiments, a computer system mines the Internet for multimedia content associated with multiple industries using a machine learning model. The multiple industries are categorized by a hierarchically indexed multimedia database including a particular branch associated with the particular industry. The computer system clusters the multimedia content among multiple issuer entities using deep learning. The deep learning is configured to determine a relationship from the multimedia content between each issuer entity and each other issuer entity. The computer system generates a node tree structured in accordance with the relationship between each issuer entity and each other issuer entity. The computer system incorporates the node tree within the hierarchically indexed multimedia database, such that the node tree is supported by the particular branch.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 7 is a diagram illustrating an example graphical user interface displaying a hierarchy dashboard for a self-building hierarchically indexed multimedia database, in accordance with one or more embodiments.

FIG. 11 is a diagram illustrating an example graphical user interface displaying an issuer profile questionnaire, in accordance with one or more embodiments.

FIG. 12 is a diagram illustrating an example graphical user interface displaying a media questionnaire, in accordance with one or more embodiments.

DETAILED DESCRIPTION

Figure 1:
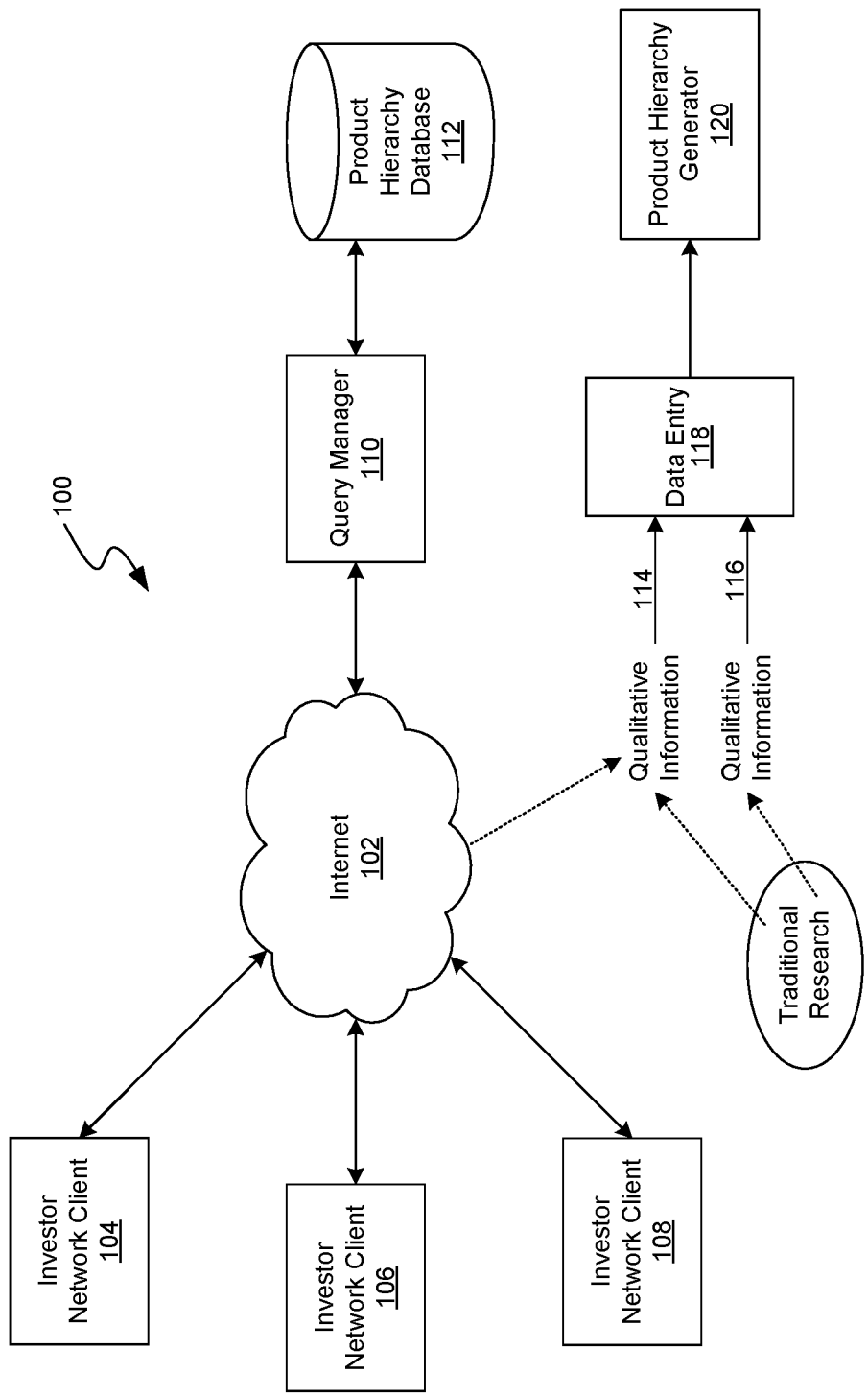
FIG. 1 is a block diagram illustrating a public company analysis system, in accordance with one or more embodiments.

In the following description, for the purposes of explanation, numerous specific details are set forth in order to provide a thorough understanding of the present embodiments. It will be apparent, however, that the present embodiments may be practiced without these specific details.

This document presents methods, systems, and apparatuses for self-building hierarchically indexed multimedia databases. A product and service-hierarchy database categorizes comparable industry, sector, and group market performance and stock investment information centered around the products produced and services performed by each company and its competitors. Examples of a product and service-hierarchy database are described in more detail in U.S. Pat. Nos. 6,338,067 and 6,405,204, each of which is incorporated herein in its entirety.

Introduced here are computer-implemented methods, apparatus, and computer systems for a self-building hierarchically indexed multimedia database that organizes multimedia content associated with issuer entities and tracks company market performance and stock investment information by the products and services produced and offered. Embodiments include a hierarchically indexed and cross-indexed issuer video and audio database, searchable by industry, sector, group, product, service, and company. Embodiments use combinatorial queries for video and audio search with unique qualitative criteria: global geography, filing status, shareholder meetings, analyst day, trading and reporting status, corporate actions, regulatory status, etc., and overlay the search with standard quantitative criteria.

The embodiments generate video and audio correlated trading alerts based upon viewing and listening activity and measure video and audio sentiment on the platform. Embodiments provide shared community input and triggers to continue constructing and evolving an adaptive, automated, self-building database. In some embodiments of the invention, a hierarchy is built multidimensionally by supervised training, e.g., by an administrator, by unsupervised training, e.g., on the basis of operations performed on the back end by an issuer/company and by query operations performed by a user. For example, a user's queries automatically create a path in the hierarchy.

The hierarchy is organized in the self-building hierarchically indexed multimedia database among multiple branches categorizing different industries, with at least one branch per industry. Each branch supports a node tree of nodes associated with issuer entities. Multimedia content associated with an issuer entity is stored at one or more nodes. The hierarchy can be implemented as a series of tables, with one table for each level in the hierarchy. The tables contain references to all category levels above that level, with a direct reference to a parent node. Additionally, each node in a level is assigned a "Primary Key" to uniquely identify that node.

Automated self-building (e.g., add nodes, remove nodes, edit existing nodes, and manage relationships between existing nodes) using machine learning is a key feature of the hierarchical system. The service system uses a machine learning module to detect patterns within node trees and determines whether patterns match closely enough to replicate additional nodes from one pattern to the other. For example, if "Branch A" (a chain of directly related nodes) contains four nodes, and three of the node names closely match (e.g., with greater than 98% word similarity) three nodes of the same relationship pattern in another industry's "Branch B," the system would indicate adding the 4th node from Branch A to Branch B in the same position.

The advantages and benefits of self-building hierarchically indexed multimedia databases using the embodiments described herein include increased investment community visibility for public and private companies compared to traditional databases. The embodiments provide scalable, global, and cost-effective exposure for issuer entities utilizing the video and audio content and functionality provided by the embodiments. The multiple searchable attributes enable investor entities to readily find issuer entities, compared to traditional video/audio platforms that are not issuer-specific. The self-building hierarchically indexed multimedia database drives investors, partners, and suitors to an issuer's business, website, crowdfunding platform, or traded security. For example, an issuer can communicate with buy-side, sell-side, and strategic partners, providing the issuer with investment sponsorship, fundraising opportunities, and economically efficient access to investors.

The benefits and advantages for investor entities includes enabling an investor to conduct diligence on an issuer entity via various video and audio content types using the functionality provided by the embodiments, e.g., company overview, product introduction, shareholder meetings, analyst day, etc. The enhanced functionality can be used to find issuers for investment via a variety of searchable attributes, e.g., geography, filing status, industry, products, trading and reporting status, intellectual property (IP), headcount, etc. Diligence time and travel expenses are reduced compared to traditional methods by displaying issuer video/audio. Moreover, video and audio alerts can be triggered based upon quantitative and qualitative factors. Enhanced communication between company executives is achieved, giving investors, partners, and suitors on-demand access to companies. In additional, the accuracy of peer group analysis and relative valuation comparisons based upon the embodiments is increased compared to traditional methods.

FIG. 1 is a block diagram illustrating a public company analysis system 100, in accordance with one or more embodiments. The system 100 operates over the Internet 102 and can support the securities investment informational needs of multiple investor entities (sometimes referred to as "investors"), represented in FIG. 1 as investor network clients 104, 106, and 108. An investor refers to an entity (such as a firm or mutual fund) that commits capital to financial instruments to earn profits or a rate of return. An issuer (sometimes referred to as an "issuer entity") refers to an entity that develops, registers and sells securities. Issuers can be corporations, investment trusts, or domestic or foreign governments.

In some embodiments, a query manager 110 appears as a Web page and interfaces the network clients 104, 106, and 108 with a product hierarchy database 112. Qualitative and quantitative information 114 and 116 about public traded companies and their products are input through a data entry system 118 to a product hierarchy generator 120. The qualitative and quantitative information 114 and 116 can come from Web-based research or traditional research based on documents and publications. The product hierarchy generator 120 builds the database 112 as a relational database that is structured by product or service type.

The database 112 is useful in the analysis of competing companies and their markets through the use of database relationships that are based on product/service hierarchies. Investors are able to conduct comprehensive comparative valuation analysis by industry, sector, sub-sector, and group product and service. Investors can also obtain hierarchical industry, sector, sub-sector, and group profiles. A combination of qualitative and quantitative data queries can be supported. Database 112 preferably allows investors to conduct queries by searching on individual or multiple qualitative and quantitative categories. Database 112 preferably allows investors to conduct qualitative analysis of quantitative data and quantitative analysis of qualitative data. Database 112 can be used in securities analysis of publicly traded or private companies and to increase partnership investment performance.

The database 112 is an investment research database 112 that provides qualitative and quantitative data for publicly traded and private companies in a single source accessible via the Internet. Database 112 supports industry, sector, sub-sector, and group hierarchical classifications based on specific products or services. Queries through the Internet 102 allow investors to determine how specific companies are positioned by group within a particular industry, sector, sub-sector, as well as relative industry, sector, sub-sector, and group by industry, sector, sub-sector, and group performance.

In some embodiments, creation of industries, sectors, sub-sectors, and groups, and the proper classification of companies enable comparative valuation and peer group analysis. The product/service hierarchy generator 120 categorizes companies into appropriate industries, sectors, sub-sectors, and groups, and product areas according to a hierarchy within their respective industries. In this way, investor users can get peer group analysis, relative valuation comparisons, and qualitative queries within a chosen industry, sector, sub-sector, or group. The hierarchy is built based on products produced or services performed within industries, which is a bottoms-up approach to company classification.

The embodiments disclosed herein implement the creation of industries, sectors, sub-sectors, and groups, and the proper classification of companies in a hierarchically indexed multimedia database. The hierarchically indexed multimedia database is the same as or similar to the hierarchically indexed multimedia database 206 illustrated and described in more detail with reference to FIG. 2. The hierarchically indexed multimedia database can learn and create and add industries, sectors, sub-sectors, and groups, and the proper classification of companies to the hierarchy (product hierarchy database 112) using supervised training. The hierarchically indexed multimedia database generates an index based upon industry, sector, node, product type, and service type, especially where entries are cross indexed to otherwise unrelated nodes within the hierarchy. Further, the hierarchically indexed multimedia database provides access to multimedia content (sometimes referred to as "media"), such as video corporate communications, podcasts, webcasts, and the like.

Figure 2:
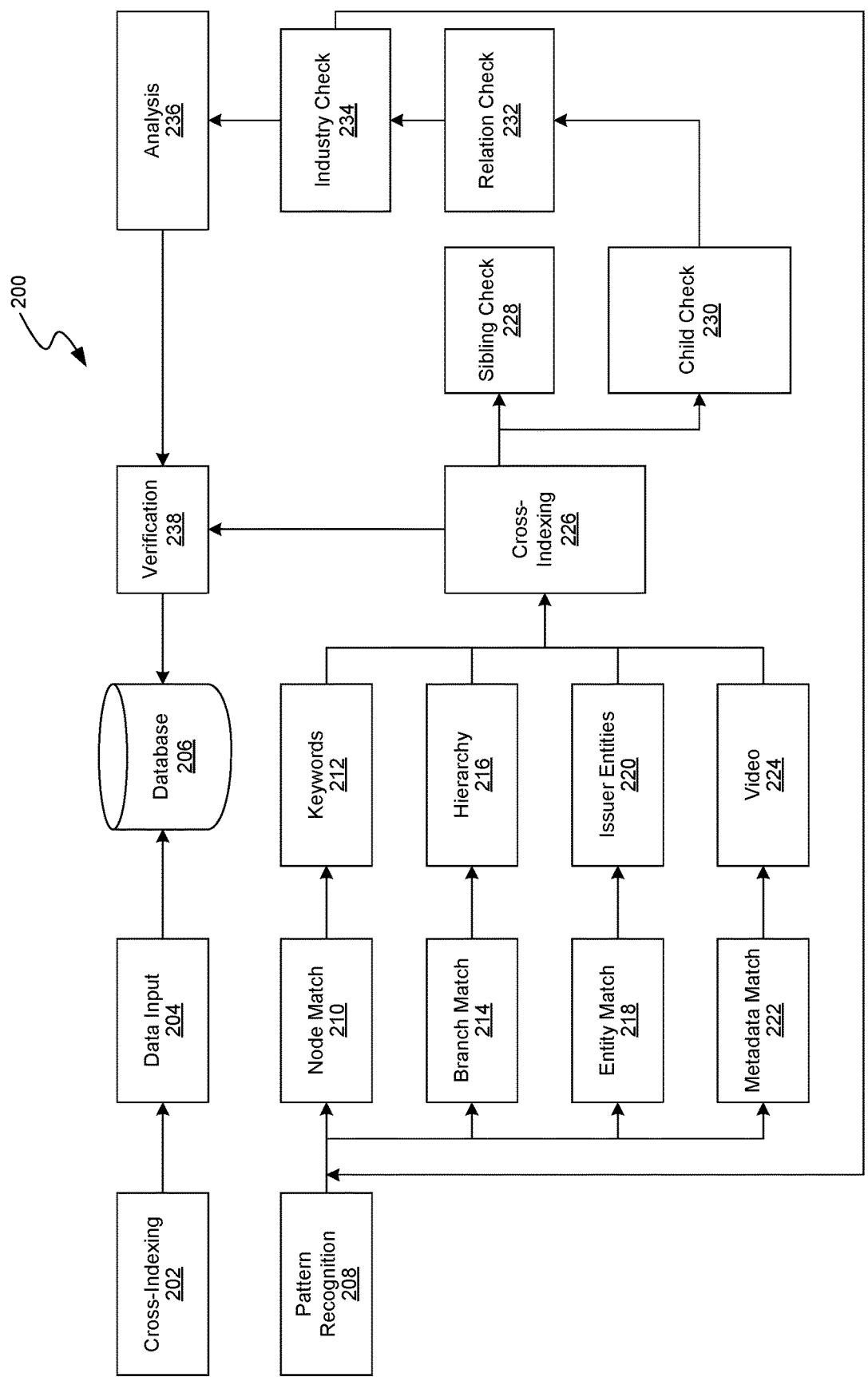
FIG. 2 is a flow diagram illustrating a process for cross indexing and automated growth of a hierarchically indexed multimedia database, in accordance with one or more embodiments.

FIG. 2 is a flow diagram illustrating a process for cross indexing and automated growth of a hierarchically indexed multimedia database 206, in accordance with one or more embodiments. In some embodiments, the process 200 of FIG. 2 is performed by a computer system, e.g., the example computer system 1000 illustrated and described in more detail with reference to FIG. 10. Particular entities, for example, the hierarchically indexed multimedia database 206 itself or a host service perform some or all of the steps of the process in other embodiments. Likewise, embodiments may include different and/or additional steps, or perform the steps in different orders. The host service is the same as or similar to the host service 524 illustrated and described in more detail with reference to FIG. 5.

In some embodiments, the computer system receives issuer profile questionnaires describing multiple issuer entities. Each issuer profile questionnaire is the same as or similar to the example issuer profile questionnaire 1100, illustrated and described in more detail with reference to FIG. 11. An example of receiving an issuer profile questionnaire is illustrated and described in more detail in step 402 with reference to FIG. 4. The computer system generates the hierarchically indexed multimedia database 206 categorizing the multiple issuer entities based on the issuer profile questionnaires. The hierarchically indexed multimedia database 206 includes at least one branch associated with a respective industry and supports at least one node. An example branch "Health Care" is illustrated and described in more detail with reference to FIG. 8. Each node references at least one issuer entity of the multiple issuer entities. An example node "Fertility Clinic" is illustrated and described in more detail with reference to FIG. 8.

In some embodiments, the issuer profile questionnaire includes metadata to provide that an issuer entity is uniquely identifiable within the system, and that when the issuer registers with the hierarchically indexed multimedia database 206, the computer system detects that the issuer already exists. The issuer will be able to recognize the existing company profile as belonging to it when the computer system displays the profile. In some embodiments, audio/video file node associations in the hierarchically indexed multimedia database 206 are the same as or a descendant of issuer profile node associations. A node is not associated below the minimum mandatory node level to an issuer. Once an issuer has registered and claimed an administratively created profile, its profile is not deleted.

In some embodiments, the graphical user interface for issuer profile creation includes a new page for issuer creation, a new page for viewing existing issuers in a table, a new page for editing/viewing issuer details, and a list of each issuer associated to a node in a "node details page" and a button that redirects a user to the issuer creation page within the node details page. The button autofills the associated node ID in issuer creation process. In some embodiments, additional logic for duplicate issuer creation and issuer deletion is included. In some embodiments, a minimum amount of metadata is included in order to uniquely distinguish a company that is entered into the hierarchically indexed multimedia database 206. The data fields can require special formatting if needed, e.g., a Data Universal Numbering System (DUNS) number, founding date, headquarters, other uniquely identifying fields. A graphical user interface of the hierarchically indexed multimedia database 206 displays pre-selected nodes to an issuer as indicative of analyst requests. An issuer entity can thus remove a suggested node association or leave the request if appropriate.

In some embodiments, a group of a parent node, direct child node, and direct grandchild node is called a branch. When two branches have significant naming or description overlap with another industry, a cross-index relationship is indicated between these branches. Branches can be cross-indexed more than once. Branch sizes may vary, with larger matching branches having a stronger suggested correlation than smaller branches. Competitors in company profiles across nodes/branches can be matched, e.g., when two companies in different nodes/industries claim to have the same competitors, that indicates a relationship between those nodes that could be weighted. Using the same weighting system as with weighting user requests, it is possible to weigh potential relationships within the hierarchies and their relevance.

The computer system extracts metadata, using a machine learning module, from multimedia content received from each issuer entity. The machine learning module is the same as or similar to the machine learning module 518 illustrated and described in more detail with reference to FIG. 5. In some embodiments, the multimedia content includes video, audio, text, or encrypted data. For example, only authorized investor entities are allowed access to decrypt the data. The metadata is indicative of the respective industry. The computer system identifies, the node using the machine learning module, based on the metadata. The machine learning module is trained based on a structure of the hierarchically indexed multimedia database 206, e.g., the structures shown in FIGS. 7 and 8. The computer system stores the multimedia content at the node, such that the multimedia content is associated with the respective industry and an issuer entity. In this manner, the computer system generates the hierarchically indexed multimedia database 206 categorizing multiple industries and issuer entities.

In some embodiments, the computer system traverses the hierarchically indexed multimedia database 206, which includes multiple branches categorizing multiple industries. Each branch supports at least one node tree associated with at least one issuer entity and stores multimedia content associated with the at least one issuer entity, as illustrated in more detail with reference to FIG. 8. The term "warp" is sometimes used to mean traverse. The term "warp" means that the database platform provides the ability for a user to be in/at any node level, any video or any audio, or within any industry, and transport the user to any other node level, other video or other audio in another industry or the same industry. The hierarchically indexed multimedia database 206 enables users to warp, i.e., move, from one video or audio at one node level to another video or audio at another node level, or from one node to another node, without searching through the hierarchically indexed multimedia database 206 manually, but instead by entering a description of another video or audio or node, in a field, next to the metadata of the current video or audio or node. Users can enter a node name, audio or video title, description or any unique identifier and the platform transports them and brings up that new video or audio.

Referring to FIG. 2, the computer system performs (208) a scheduled process for automated pattern recognition triggers for self-building of the hierarchically indexed multimedia database 206. For example, in step 210, the computer system performs node name text matching. The computer system determines (212) whether keywords or phrases between two nodes in the tree match each other. In some embodiments, the computer system references a library of synonymous or equivalent words or named. The hierarchy structure is stored in the database. As the user browses the hierarchy, the system returns the hierarchy to the user to view. Videos are associated to each hierarchy node and as the system returns the video metadata and multimedia content host's universal resource locator (URL) to be embedded in the web page, either as a thumbnail or an embedded, playable video. A URL, or web address, is a reference to a web resource that specifies its location on a computer network and a mechanism for retrieving it. The multimedia content host is the same as or similar to the multimedia content host 528 illustrated and described in more detail with reference to FIG. 5.

In some embodiments, the computer system extracts a first pattern from a first node tree supported by a first branch of the hierarchically indexed multimedia database 206 using a machine learning module trained based on the hierarchically indexed multimedia database. The first branch is associated with a first industry. For example, in step 214, the computer system performs branch matching within the hierarchically indexed multimedia database 206. The computer system determines (216) whether there are surrounding nodes within a directly linked chain of one or many nodes. Every video is associated to the issuer who uploaded the video through a field in a video table which references the issuer's Primary Key.

In some embodiments, the computer system extracts a second pattern from a second node tree supported by a second branch of the hierarchically indexed multimedia database 206 using the machine learning module. The second branch is associated with a second industry different from the first industry. The first node tree includes at least one node more than the second node tree. For example, the computer system performs (218) issuer/competitor matching within the hierarchically indexed multimedia database 206. The computer system determines (220) whether there are multiple issuers associated with the same two nodes and whether the same competitors are associated to issuers at different nodes.

In some embodiments, the computer system determines that the first pattern matches the second pattern using the machine learning module. The machine learning module is trained to compare two patterns extracted from the hierarchically indexed multimedia database 206. For example in step 222, the computer system matches (222) video metadata and performs speech-to-text recognition on content stored in the hierarchically indexed multimedia database 206. The computer system determines (224) whether there are similarities between the content of the videos associated to (or stored at) a first node and the videos associated to a second node.

In some embodiments, the computer system cross-indexes at least one of the new node or the second node tree with the first node tree based on the first pattern. For example in step 226, the computer system determines whether any of the four steps 212, 216, 220, and 224 were successful. If so, a cross-indexed node match is indicated. The computer system verifies (238) review and approval for the cross-indexing. The hierarchy is a node tree that exists on two planes, up/down and left/right a single tree. It is possible to consider the various industries as a third dimension, with nodes being linked between industries as well. This would be accomplished by using a cross-industry reference (cross-indexing) table to track the relationships between nodes between different industries, or even between branches of the same industry if needed. The hierarchy is three dimensional and has cross-indexing between nodes at different industries.

The computer system determines (228) whether a first node has a sibling second node on the same level and not present elsewhere in the hierarchically indexed multimedia database 206. In some embodiments, an investor is enabled to search for and browse videos according to the hierarchy. The hierarchically indexed multimedia database 206 (referred to as an "issuerPixel database") stores videos and tracks their hierarchical categorization in a reference table which contains a record of the VideoID (the Primary Key identifier for every video in the video table) and the HierarchyNodeID (the Primary Key identifier for every node in the industry categorization table). The reference table provides a single table which the system can search either based on the VideoID or the HierarchyNodeID, and allows for multiple videos to be associated to a single categorization node and for a single video to be associated to multiple categorization nodes.

The computer system determines (230) whether a first node has a child node not present under the other (second) node. In some embodiments, each categorization node in the hierarchy has an ID associated to it, and each video is associated to at least one hierarchy node. As a user views a graphical user interface of the issuerPixel application (see FIGS. 7-8) and browses or searches according to hierarchy, the issuerPixel application looks up the relevant hierarchy nodes and then searches the reference table for those HierarchyNodeIDs. The system determines the VideoIDs associated to those HierarchyNodeIDs and looks up the video's hosting address to begin the process of retrieving the video from a multimedia content host (e.g., YouTube in a particular implementation), so that the user can view a thumbnail of the video and begin playing the video if desired. The multimedia content host is the same as or similar to the multimedia content host 528 illustrated and described in more detail with reference to FIG. 5.

The computer system determines (232) whether the child nodes, sibling nodes, or ancestor nodes (parent, grandparent, great grandparent, etc.) are similar. In some embodiments, the hierarchy structure is stored in the database so that as the user browses the hierarchy the system returns the hierarchy to the user to view. Videos are associated to each hierarchy node and the system returns the video metadata and multimedia content host's URL to be embedded in the web page (either as a thumbnail or an embedded, playable video).

The computer system determines (234) whether the nodes are in the same industry, in industries with cross-indexed nodes, or nodes generated from matched patterns. In some embodiments, each video is associated to the issuer that uploaded the video through a field in the video table which references the issuer's Primary Key. Each video has an issuer associated to it, and issuers cannot be deleted (they can be inactivated, but a record of them will remain in the database), so that data integrity is not lost. In addition to being associated to an issuer, the video is also associated directly to a company (here, an issuer user and an issuer company are differentiated).

In some embodiments, responsive to determining that the first pattern matches the second pattern, the computer system incorporates a new node corresponding to the at least one node within the second node tree in accordance with the first pattern. For example, in step 236, the computer system analyzes the results of previous checks and potentially indicates a node addition (e.g., child or sibling node) to the hierarchically indexed multimedia database 206. An example of node addition is illustrated and described in more detail with reference to FIG. 8.

The computer system reviews (202) the hierarchy of the hierarchically indexed multimedia database 206 and determines cross-indexed nodes. In step 204, the computer system performs data entry for storage in the hierarchically indexed multimedia database 206. A new node is added to the hierarchically indexed multimedia database 206. In some embodiments, the hierarchy is a node tree that exists on two planes: up/down and left/right as a single tree. The various industries can be implemented as a third dimension, with nodes being linked between industries as well. This is accomplished by using a "Cross-Industry Reference" cross-indexing table to track the relationships between nodes between different industries, or even between branches of the same industry if needed. The hierarchy is three-dimensional and performs cross-indexing between nodes of different industries and sometimes, within the same industry.

Figure 3:
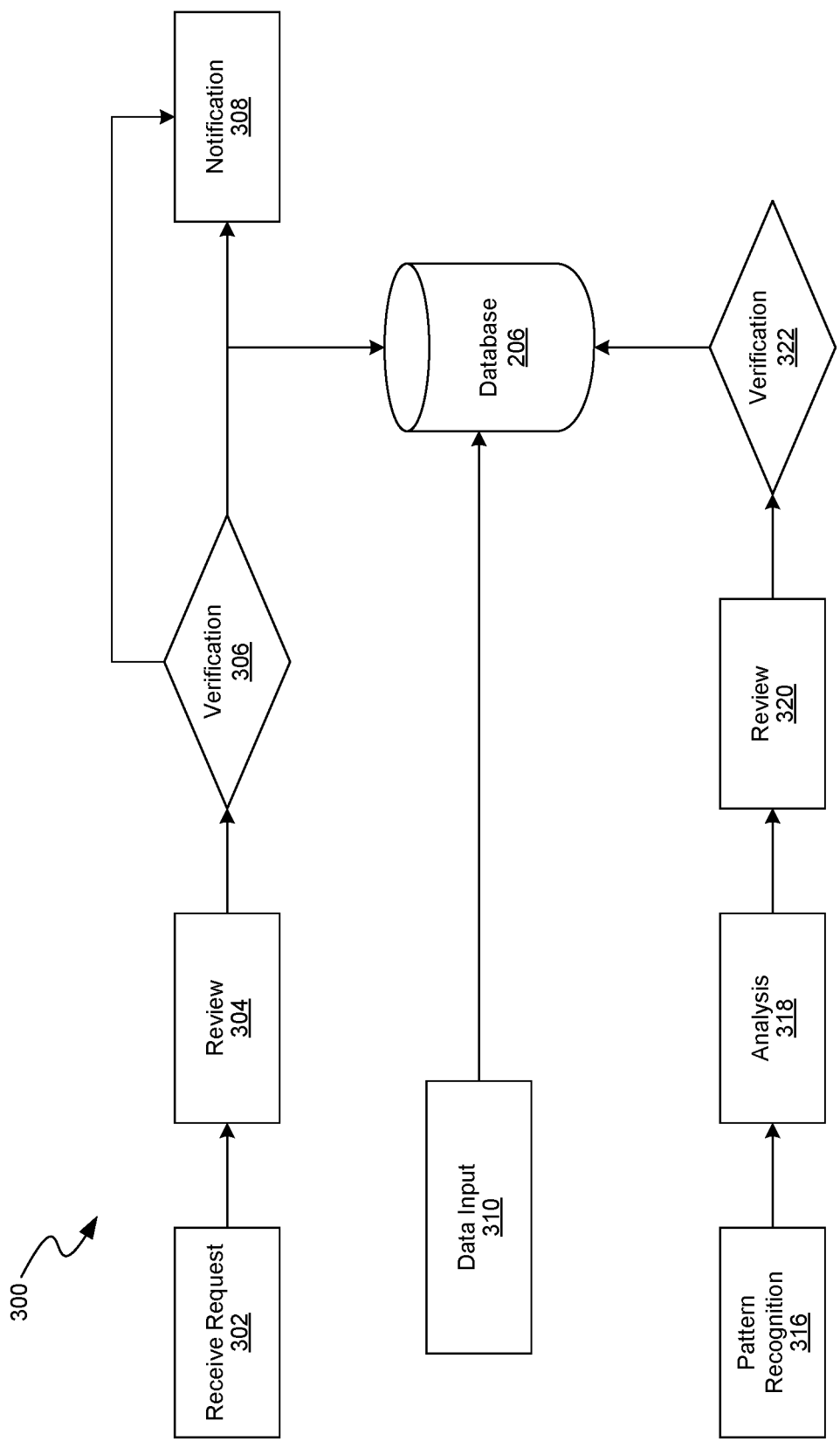
FIG. 3 is a flow diagram illustrating hierarchy building, in accordance with one or more embodiments.

FIG. 3 is a flow diagram illustrating hierarchy building, in accordance with one or more embodiments. The hierarchy building is performed for a hierarchically indexed multimedia database 206, illustrated and described in more detail with reference to FIG. 2. In some embodiments, the process 300 of FIG. 3 is performed by a computer system, e.g., the example computer system 1000 illustrated and described in more detail with reference to FIG. 10. Particular entities, for example, the hierarchically indexed multimedia database 206 or a host service perform some or all of the steps of the process in other embodiments. Likewise, embodiments may include different and/or additional steps, or perform the steps in different orders. The host service is the same as or similar to the host service 524 illustrated and described in more detail with reference to FIG. 5.

The computer system receives (302) a request to modify a node of the hierarchically indexed multimedia database 206 categorizing multiple issuer entities. The request is received from an investor entity or an issuer entity. The hierarchically indexed multimedia database 206 includes at least one branch associated with a respective industry and supports a node tree including the node to be potentially modified. For example, the computer system enables investors and issuers (company users) to provide requests in the hierarchy which are then implemented if approved. Users can submit requests to add, edit, or subtract nodes to the hierarchy through a suggestion box available for every visible node within the hierarchy view. In some embodiments for issuers, the hierarchy tree shows in the issuer profile questionnaire and in a media questionnaire. The issuer profile questionnaire is the same as or similar to the issuer profile questionnaire 1100, illustrated and described in more detail with reference to FIG. 11. The media questionnaire is the same as or similar to the media questionnaire 1200 illustrated and described in more detail with reference to FIG. 12. For investors, the hierarchy tree shows in their homepage and video browsing/search pages, where they can browse through the hierarchy or search based on the hierarchy accordingly.

In some embodiments, the computer system extracts features indicative of a priority of the request. A feature is an individual measurable property or characteristic of the raw input data. For example, features can be numeric or structural, such as strings or graphs. The features include a position of the node in the structure of the hierarchically indexed multimedia database 206. The features are extracted from the request, other requests received to modify the node, and a structure of the hierarchically indexed multimedia database 206. For example in step 304, the computer system analyzes the request to determine the priority of the request based on the features using a machine learning module trained based on the structure of the hierarchically indexed multimedia database 206 and the other requests. The machine learning module is the same as or similar to the machine learning module 518 illustrated and described in more detail with reference to FIG. 5.

The computer system verifies (306) the request. In some embodiments, the computer system positions the request within the other requests based on the priority. For example, the computer system weighs the value of the request based on factors, such as who submitted the request (a list of high weight email domain names is used to lend specific users more weight with their requests), how many requests were submitted for the same node (more weight for more requests for the same node), and the position of the node in the hierarchy, as well as others. A request having a higher weight shows higher in the administrator panel's list to be reviewed.

In some embodiments, once an administrator approves of a request, the suggested change is automatically implemented by the computer system and the user is notified of the change. Changes include adding a node under the target node, removing a target node and all descendants of that node, and changing the name of a node. An administrator can review each change before it is implemented, and may conditionally accept a change of a node so that the user is notified the change was accepted. The computer system transmits (308) a response to the investor entity or the issuer entity of the multiple issuer entities. The response indicates that the request to modify the node is satisfied.

In some embodiments, the computer system bypasses the request mechanism to directly modify a node based on prior, internal analysis (310) of the hierarchically indexed multimedia database 206. In some embodiments, the hierarchically indexed multimedia database 206 categorizes videos according to a proprietary industry classification tree. Additional metadata and files are also associated to each video (depending on user-generated content) to provide users with the ability to search for and find videos using detailed fields such as the categorization hierarchy and other qualitative characteristics based on the issuer profile questionnaire and media questionnaire metadata. In some embodiments, audio media files have separate questionnaires with audio specific fields and dropdowns. Additionally, the hierarchically indexed multimedia database 206 application supports playing audio files using a podcast player. Audio files take the format of either MP3 or M4A files. MP3 (sometimes referred to as MPEG-1 Audio Layer III or MPEG-2 Audio Layer III) is a coding format for digital audio. MP4A (sometimes referred to as MPEG-4 Part 3 or MPEG-4 Audio) is part of an international standard for audio coding. The hierarchically indexed multimedia database 206 application can convert audio files from common formats to MP3 or M4A.

In some embodiments, the computer system performs (316) automated pattern recognition, using the machine learning module, triggered by changes in the hierarchically indexed multimedia database 206. In some embodiments, more adaptive node pattern matching is implemented, e.g., by matching patterns in node names or similarities in node names across branch chunks. A parent node, direct child node, and direct grandchild node (etc.) are called a branch. When two branches have significant naming or description overlap with another industry, an automatic cross-index relationship between these branches is indicated. Branches can be cross-indexed more than once. Branch sizes vary, with larger matching branches having a stronger "suggested correlation" than smaller branches. In some embodiments, matching competitors in company profiles across nodes/branches is performed. When two companies in different nodes/industries have the same competitors, a relationship between those nodes that could be weighed by an administrator is indicated. Using the same weighting system as with weighting user requests, it is possible to weigh potential relationships within the hierarchies and their relevance.

In step 318, the computer system analyses (318) a textual name of the node as well as metadata present within multimedia content saved at the node, and performs data processing to identify an indicated change in the node. In some embodiments, data elements are stored in the hierarchically indexed multimedia database 206 in a table designated for issuer profile questionnaire answers. Each answered issuer profile questionnaire is given a unique ID and is represented by a single row in an issuer profile questionnaire table, with answers either in the form of alphanumeric input or as a Foreign Key reference to another table of stored dropdown/ checkbox inputs. For example, in a media questionnaire, the possible answers of "CEO," "VP," "COO," etc., are all stored in a separate "Presenter" table and each has a unique stored ID. In the issuer profile questionnaire table, for the column "Presenter" the values would all be Foreign Keys which reference a unique ID for one of the "Presenter" table values. When the computer system displays a Presenter, it will reference the issuer profile questionnaire table, pull the Foreign Key value in the presenter column, and then lookup which Presenter type matches that ID in the Presenter table.

The computer system reviews (320) the other requests received to modify the node from users, investors, issuers, or the computer system itself (310). In some embodiments, requests are prioritized from some users over others in accordance with who submitted the request (e.g., a list of high-weight email domain names will be used to lend specific users more weight with their requests), how many requests were submitted for the same node (e.g., more weight for more requests for the same node), or a position of the node in the hierarchy (e.g., more weight for nodes in a higher position, since a change would affect more nodes). In some embodiments, requests are prioritized based on an age of the industry, an age of the node, a last modified date of the node, a number of parent nodes (of all replicas), a number of child nodes, a number of replica nodes, a number of recent requests for industry, a number of recent requests for ancestor nodes, a number of companies associated to this node or descendant nodes, or a number of media files associated to this node or descendant nodes.

The computer system verifies (322) the node change. In some embodiments, the computer system positions the request within the other requests based on the priority. In some embodiments, the hierarchy supports up to nine category levels (from the highest level of "Industry" to the lowest of "Sub-Tier"), and is capable of supporting more. Authorized users are able to add, duplicate, subtract, and edit existing nodes as well as to create additional connections between existing nodes (both in the form of adding an association between nodes of adjacent levels in the same tree, and by cross-indexing nodes). Application users (both company users and investors) are able to submit requests to add, edit, and subtract nodes to the hierarchy through a suggestion box available for every node they can see within the hierarchy tree views allowed to them. For issuers, the hierarchy tree would show in the issuer profile questionnaire and in the media questionnaire. For investors, the hierarchy tree would show in their homepage and video browsing/ search pages, where they can browse through the hierarchy or search based on the hierarchy accordingly. The suggestion box is displayed in a few different ways, e.g., a button next to each hierarchy node which, when clicked, shows a new popup window with the node's information (including the all of the direct ancestors of the node and the immediate children nodes of that node) along with the three request types of Add, Remove, or Edit and a textbox for the user to explain their request. Requests will be tied to the user's profile.

In some embodiments, the computer system modifies the node tree with respect to the structure of the hierarchically indexed multimedia database 206, such that the request to modify the node is satisfied. The hierarchically indexed multimedia database 206 is not only 1) automatically self-building and 2) not only being built by analysts. There is also an important 3) shared community building of the hierarchically indexed multimedia database 206. The shared community consists of users on the front end of the platform. Here with the hierarchically indexed multimedia database 206, users are running queries and analyzing the node tree of each industry hierarchy and they have the ability to press icons at each node level, to suggest to the system to add a node, delete a node, or replace a node with a new node. Therefore, the shared community is one of the ways that the database continues to build and expand.

Figure 4:
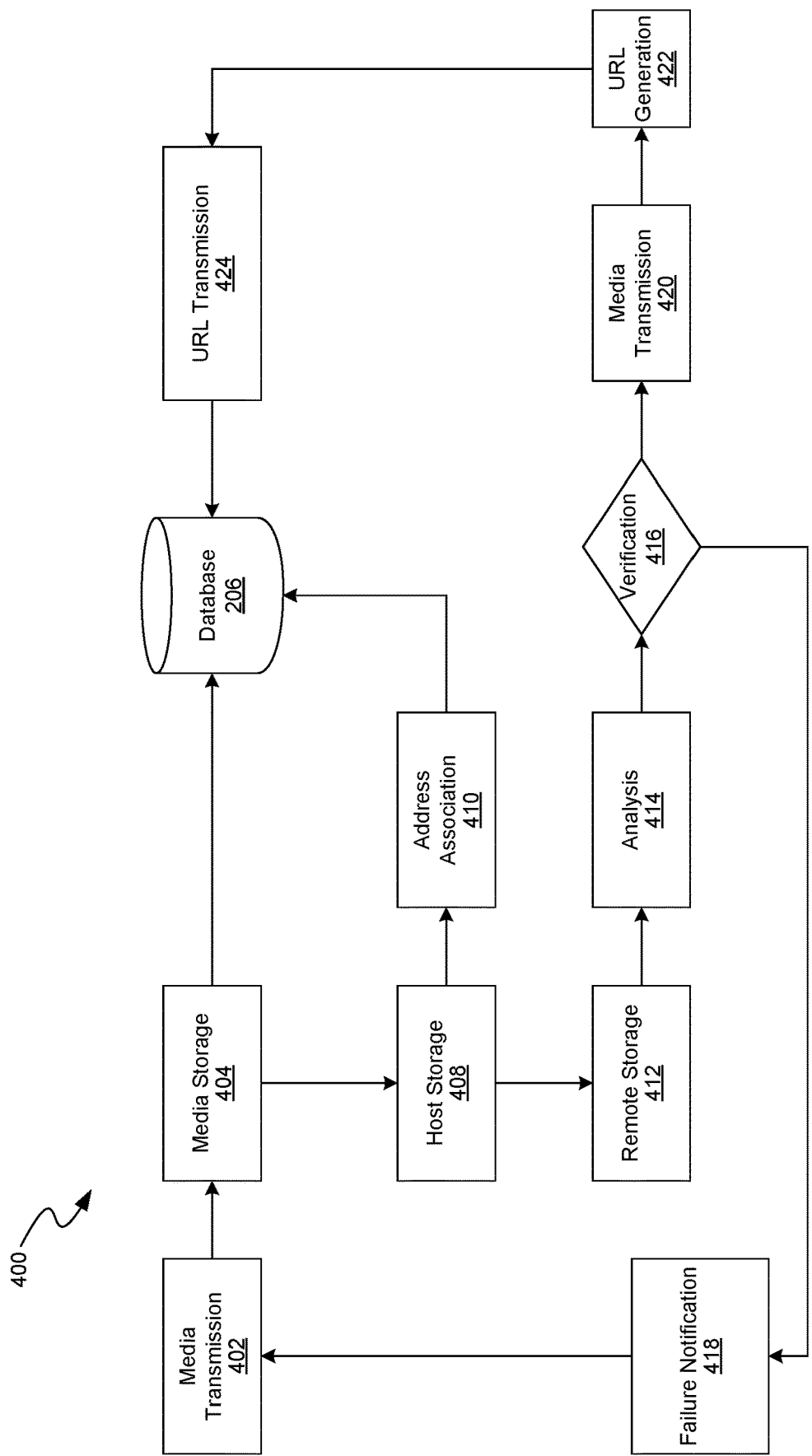
FIG. 4 is a flow diagram illustrating media upload, storage, and hosting for a self-building hierarchically indexed multimedia database, in accordance with one or more embodiments.

FIG. 4 is a flow diagram illustrating media upload, storage, and hosting for a self-building hierarchically indexed multimedia database 206, in accordance with one or more embodiments. The hierarchically indexed multimedia database 206 is illustrated and described in more detail with reference to FIG. 2. In some embodiments, the process 400 of FIG. 4 is performed by a computer system, e.g., the example computer system 1000 illustrated and described in more detail with reference to FIG. 10. Particular entities, for example, the hierarchically indexed multimedia database 206, a multimedia content host or a host service perform some or all of the steps of the process 400 in other embodiments. Likewise, embodiments may include different and/or additional steps, or perform the steps in different orders. The host service is the same as or similar to the host service 524 illustrated and described in more detail with reference to FIG. 5. The multimedia content host is the same as or similar to the multimedia content host 528 illustrated and described in more detail with reference to FIG. 5.

The computer system receives (402) a media questionnaire and multimedia content from a particular issuer entity of multiple issuer entities categorized by the hierarchically indexed multimedia database 206. The media questionnaire is the same as or similar to the media questionnaire 1200, illustrated and described in more detail with reference to FIG. 12. The hierarchically indexed multimedia database 206 is stored by a multimedia content host or host service. The hierarchically indexed multimedia database 206 includes at least one node referencing the particular issuer entity. For example, videos are categorized according to an industry classification tree. The system also associates additional metadata and files to each video, depending on user generated content, to provide users with the ability to search for and find videos using detailed fields, such as the categorization hierarchy and other qualitative characteristics, e.g., based on issuer profile questionnaire metadata or media questionnaire metadata. The issuer profile questionnaire is the same as or similar to the issuer profile questionnaire 1100, illustrated and described in more detail with reference to FIG. 11.

An issuer completes a media questionnaire for each video uploaded to the system. The media questionnaire values entered by the user are stored in the hierarchically indexed multimedia database 206 as a row of the media questionnaire table. Data elements are stored in the hierarchically indexed multimedia database 206 in a table designated for media questionnaire answers. Each answered media questionnaire is given a unique ID and is represented by a single row in the media questionnaire table, with answers either in the form of alphanumeric input or as a Foreign Key reference to another table of stored dropdown/checkbox inputs. For example, in a media questionnaire, the possible answers of "CEO," "VP," "COO," etc., are all stored in a separate "Presenter" table and each have a unique stored ID. In the media questionnaire table, for the column "Presenter" the values would all be Foreign Keys which reference a unique ID for one of the "Presenter" table values. When the system needs to display who the Presenter was for this video, it references the media questionnaire table, pulls the Foreign Key value in the presenter column, and then looks up which Presenter type matches that ID in the Presenter table.

In step 404, the computer system extracts media questionnaire metadata and metadata from the multimedia content, stores the metadata in the hierarchically indexed multimedia database 206. For example, the computer system extracts the metadata, using a machine learning module, from the media questionnaire and multimedia content, where the metadata is indicative of an industry. The machine learning module is the same as or similar to the machine learning module 518 illustrated and described in more detail with reference to FIG. 5. The computer system identifies a branch using the machine learning module based on the metadata. In some embodiments, the computer system traverses the hierarchically indexed multimedia database 206 using a machine learning module, based on the multimedia content, to identify at least one node corresponding to the issuer entity.

The computer system stores (408) the video or audio at a node tree (including the node) supported by the branch, such that the video or audio is associated with the industry and the issuer entity. An address of the multimedia content stored in the hierarchically indexed multimedia database 206 is associated to the multimedia content. In some embodiments, videos are uploaded by a user from local storage after filling out a media questionnaire. The computer system verifies that the video is of an acceptable format and also verifies the integrity of the video using the ffmpeg command, which if specified to, reads the input file and reports any errors that appear. An example command line (for Linux) used is:

ffmpeg -v error -i file.avi -f null -2>error.log

Here, "-v error" refers to a certain level of verbosity (to show some errors that are normally hidden because they don't affect playability a much). A full error log with some generic information about ffmpeg is output, which can be analyzed using filters written to perform batch check of similar files.

The multimedia content is pushed (412) to remote storage at the host service. For example, the computer system stores videos and files uploaded by users to the host service. The host service provides reliable, secure, and scalable data storage at a competitive price. Each file/video stored at the host service is assigned an address, and the service database contains references linking the uploader and the address, along with a unique, system-assigned ID for the video (a Primary Key). The database 206 also stores video metadata captured from a media questionnaire alongside a VideoID, such as the node(s) the video is associated to, the name of the video, the date the video was created, etc.

In step 410, the computer system performs address association for the video. In some embodiments, the computer system retains a copy of the video at the host service storage for backup/future reference. If the computer system is unable to retrieve the video from the 528, the computer system can either play the video directly (through a built-in video player) or play the video through another backup hosting service. In some embodiments, once the computer system has determined which videos need to be retrieved based on a user's search criteria, the system looks up those video entries in the video table and then looks up the multimedia content host (e.g., YouTube in a particular implementation) URL associated to every video entry. This URL is pulled and then used in the front-end of the web application to embed the target video in the web app for viewing. The multimedia content host is the same as or similar to the multimedia content host 528 illustrated and described in more detail with reference to FIG. 5.

The computer system analyzes (414) integrity of the multimedia content stored at the host service. If the analysis fails (416), the issuer entity is notified (418) of the file integrity failure and the issuer entity is requested to resubmit the multimedia content. If the analysis passes, the multimedia content is pushed (420) to a multimedia content host, which can be the same as or different from the host service. For example, once the video is uploaded and stored at the host service, the computer system begins the process of automatically submitting the video to a multimedia content host through the multimedia content host's application programming interface (API). An API is a computing interface that defines interactions between multiple software or mixed hardware-software intermediaries. The host service automatically sends the multimedia content host the video file and metadata and, once successfully uploaded to the multimedia content host, the multimedia content host returns a video URL. The host service stores this video URL with a VideoID and references this URL whenever the application needs to retrieve and play the video. The video stored at the host service, the address generated, and the database entries of the video address and metadata are generated simultaneously by the database 206 at the time of the video submission by the user.

In some embodiments, the computer system receives a URL from the multimedia content host referencing the multimedia content stored at the node. For example, in step 422, the host service or multimedia content host generates a URL corresponding to the multimedia content. The computer system receives (424) the URL from the multimedia content host for the media embed, and the URL is stored in the hierarchically indexed multimedia database 206 and associated to the media object. The computer system can receive a combinatorial query from an investor entity requesting the multimedia content. Responsive to receiving the query, the computer system displays the multimedia content using the URL on a graphical user interface.

Figure 5:
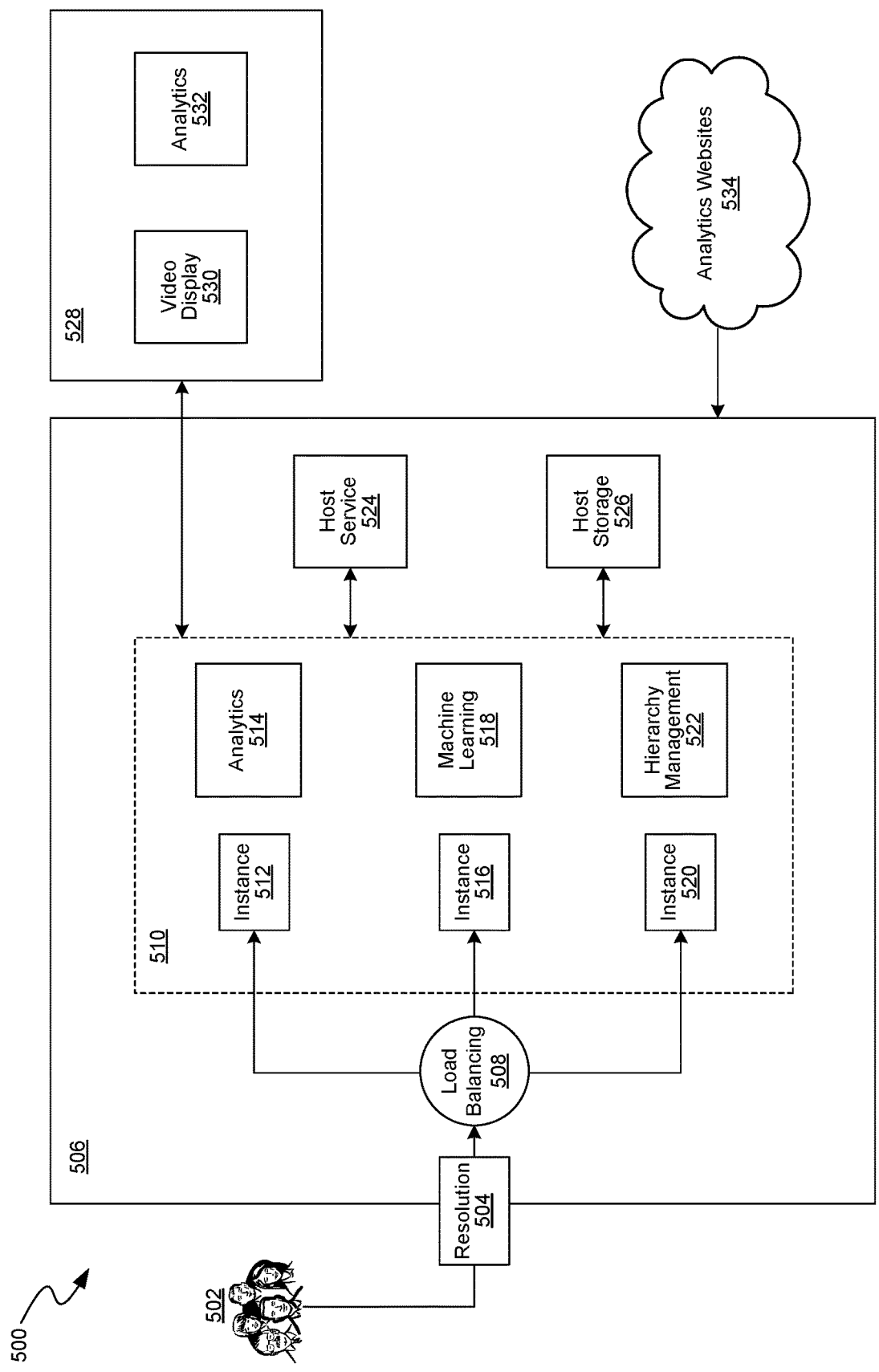
FIG. 5 is a block diagram illustrating a system network architecture, in accordance with one or more embodiments.

FIG. 5 is a block diagram illustrating a system network architecture 500, in accordance with one or more embodiments. The system network architecture 500 includes users 502 (e.g., investor entities, issuer entities, and administrators), a cloud service 506, a multimedia content host 528, and analytics websites (534). Likewise, embodiments may include different and/or additional components, or connected in different implementations. The system network architecture can be implemented using components of the computer system 1000 illustrated and described in more detail with reference to FIG. 10.

The cloud service 506 provides an on-demand cloud computing platform and APIs, e.g., on a metered pay-as-you-go basis. The cloud service provides a variety of abstract technical infrastructure and distributed computing building blocks and tools. The cloud service 506 includes a Domain Name System (DNS) resolver 504, an application load balancer 508, a container 510, an instance 512, an analytics module 514, an instance 516, a machine learning module 518, an instance 520, a hierarchy management tool 522, a host service 524, and remote host storage 526. DNS refers to a hierarchical and decentralized naming system for computers, services, or other resources connected to the Internet or a private network. The DNS resolver 504 is a server on the Internet that converts domain names into Internet Protocol (IP) addresses. IP refers to the principal communications protocol in the Internet protocol suite for relaying datagrams across network boundaries.

In a particular implementation, the hierarchically indexed multimedia database (referred to as an "issuerPixel database") stores all videos and files uploaded by users to Amazon S3 storage under an issuerPixel Amazon Web Services (AWS) account. S3 refers to Amazon Simple Storage Service, a service offered by Amazon Web Services that provides object storage through a web service interface. S3 storage provides reliable, secure, and scalable data storage at a competitive price. Each file/video stored in S3 is assigned an address, and the issuerPixel database contains references linking the uploader and this address, along with a unique, system-assigned ID for that video (a Primary Key). Once the video is uploaded and stored in S3, the computer system will then begin the process of automatically submitting the video to the issuerPixel database's multimedia content host 528 (e.g., YouTube in a particular implementation) through the multimedia content host 528's API. The issuerPixel application will automatically send the multimedia content host 528 the video file and the metadata, and once successfully uploaded to the multimedia content host 528's issuerPixel account, the multimedia content host 528 will return the video URL. The issuerPixel application will then store this video URL with the VideoID and will reference this URL whenever the application needs to retrieve and play the video.

The computer system retains the copy of the video in S3 storage for backup/future reference, so if the system is unable to retrieve the video from the multimedia content host 528 (e.g., YouTube in a particular implementation), the computer system can either play the video directly (through a built-in video player) or play the video through another backup multimedia content host service (e.g., Vimeo, Panopto, Vidyard, etc., in particular implementations). The issuerPixel application stores all of the data collected via the issuer profile and media questionnaires, user feedback, and user activity on the website in the database in the form of tables. The issuer profile questionnaire is the same as or similar to the issuer profile questionnaire 1100, illustrated and described in more detail with reference to FIG. 11. The media questionnaire is the same as or similar to the media questionnaire 1200, illustrated and described in more detail with reference to FIG. 12.

The issuerPixel application uses a relational database (e.g., MySQL in a particular implementation), which is structured to maintain data integrity and to inherently support the relationships between objects such as users and questionnaire responses. MySQL refers to an open-source relational database management system built using Structured Query Language (SQL). The hierarchically indexed multimedia database is hosted using Amazon's Relational Database Service (RDS) service under the issuerPixel AWS account in a particular implementation. Amazon RDS refers to a distributed relational database service by Amazon Web Services. It is a web service running "in the cloud" designed to simplify the setup, operation, and scaling of a relational database for use in applications. Videos are stored in Amazon's S3 storage service with each video being assigned an address by S3. This address is stored in the hierarchically indexed multimedia database and associated to the uploader as well as the video metadata (hierarchical categorization, date, name of video, etc.). The video being stored in S3, the address being generated, and the hierarchically indexed multimedia database entries of the video address and metadata are all generated simultaneously by the issuerPixel application at the time of the video submission by the user. The application load balancer 508 automatically distributes incoming traffic across multiple targets, such as Amazon Elastic Compute Cloud (EC2) instances, containers, and IP addresses, in one or more availability zones. Amazon EC2 is a part of Amazon's cloud-computing platform, Amazon Web Services.

The container 510 is administered by a scalable container management service that isolates the container 510 from others and bundles its software, libraries and configuration files. The container 510 is isolated from other containers and bundles its own software, libraries, and configuration files. The container 510 communicates with other containers through well-defined channels.

The instances 512, 516, and 520 are each instances of the application for users 502 to operate a hierarchically indexed multimedia database, such that each instance is a provisionable entity, and a combination of IT resource instance (target connectivity and connector configuration) and resource object (provisioning mechanism). The hierarchically indexed multimedia database is the same as or similar to the hierarchically indexed multimedia database 206 illustrated and described in more detail with reference to FIG. 2.

The analytics module 514 provides financial analytics and views. In some embodiments, the computer system uses the analytics module 514 to determine a first metric quantifying social media engagement, communication network activity, a trading volume, and a stock value associated with a particular issuer entity. The social media engagement includes at least one of a social sentiment API feed or a social sentiment indicator. The social media engagement measured includes, but is not limited to, Facebook, Instagram, Pinterest, Twitter, Wechat, Ozone, Tumblr, Messenger, Reddit, SnapChat, Line, TikTok, etc. Social sentiment sites and platforms include sites such as Stock Twits, etc. The social sentiment API feeds include Social Sentiment.io, Social Market Analytics, and Hedge Chatter. Messenger Apps include WhatsApp, Viber, Telegram, and Facebook Messenger. The communication network activity includes at least one of instant messaging activity, instant messaging frequency, or a chat room population. The trading volume, and a stock value can be obtained from the analytics websites 534. In some embodiments, the computer system mines the Internet to aggregate changes in the social media engagement, the communication network activity, the trading volume, and the stock value associated with the particular issuer entity. Mining refers to a process of discovering patterns in large data sets and across the Internet using searches, machine learning, statistics, and database systems. Determining the first metric is based on the changes. In some embodiments, determining the second metric includes triangulating between the social media engagement, the communication network activity, the trading volume, and the stock value associated with the first issuer entity.

The machine learning module 518 encapsulates a specific machine learning algorithm, function, or code library that builds a model based on sample data, known as "training data," in order to make predictions or decisions without being explicitly programmed to do so. The machine learning module 518 applies machine learning techniques to generate a machine learning model that, when applied to extracted features, outputs indications of whether the features have an associated property. As part of the generation of the machine learning model, the machine learning module 518 forms a training set of features by identifying a positive training set of features that have been determined to have the property in question, and, in some embodiments, forms a negative training set of features that lack the property in question. In one embodiment, the machine learning module 518 applies dimensionality reduction (e.g., via linear discriminant analysis (LDA), principle component analysis (PCA), or the like) to reduce the amount of data in the features for content items to a smaller, more representative set of data.

The machine learning module 518 uses supervised machine learning to train the machine learning model, with the features of the positive training set and the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The machine learning model, when applied to the features extracted, outputs an indication of whether the features have the property in question.

In some embodiments, the computer system mines the Internet for multimedia content associated with multiple industries using the machine learning model 518. The machine learning model 518 is trained using features indicative of at least a particular industry of the multiple industries. The multiple industries are categorized by the hierarchically indexed multimedia database, which includes multiple branches including a particular branch associated with the particular industry.

In some embodiments, the computer system uses the machine learning model 518 to cluster the multimedia content among multiple issuer entities of the particular industry using deep learning. Deep learning architectures include deep neural networks, deep belief networks, recurrent neural networks, and convolutional neural networks. Deep learning involves the use of multiple layers in the network having an unbounded number of layers of bounded size, which permits practical application and optimized implementation. In some embodiments, the deep learning is configured to determine a relationship from the multimedia content between each issuer entity of the multiple issuer entities and each other issuer entity of the multiple issuer entities.

In some embodiments, the hierarchically indexed multimedia database automatically populates the same video or audio of the same company at the same node level with the same name under a different industry in the hierarchy. The hierarchically indexed multimedia database automatically populates multiple companies and their attached videos and audio recordings located at multiple node levels within and across multiple industries. The hierarchically indexed multimedia database is constantly scanning the industry hierarchies looking for patterns of identical paths of multiple node levels in one industry to copy the missing node levels with associated companies and their corresponding audio and videos to another industry. In this way, the database is both cross-indexing and automatically building itself.

The hierarchy management tool 522 adds nodes to node trees, replicates portions of node trees, instantiates branches, updates node trees, and cross-indexes nodes based on new multimedia content and information from the analytics websites 534. In some embodiments, rule sets are defined for use in hierarchy management. For example, an issuer is associated with at least one node, determined in the issuer profile questionnaire. An issuer can select a higher tier node to associate to its profile, because a company can provide multiple services and products. An issuer can have multiple nodes associated to it, both within the same industry and across industries. To select multiple nodes, the issuer can use a hierarchy dropdown selection and choose to add a node to its profile. Issuer signups are reviewed by the computer system before they are approved in the platform; optionally, mandatory review-alerts are triggered if multiple nodes are selected by a company. The nodes associated to video/audio files can be different from what is associated to an industry but is a direct descendant of one of the company's profile nodes. A Video/Audio node is the lowest node level in a branch.

In some embodiments, a rule set is used to associate Video/Audio nodes to a maximum of three nodes, and they can be associated to a cross-indexed node. These are lowest tier nodes (see FIG. 8). An alternative to this is to allow a video/audio file to be associated to multiple nodes, but they are lowest-level nodes under the company node. Cross-indexed nodes are considered functionally equivalent, meaning if a video is associated to node cross-indexed to another, then searching either node should show the same video. All nodes are considered products for the purposes of categorization, but in the media questionnaire and in the metadata associated to each video, the computer system will differentiate between the media files as either product-related, service-related, or both.

In some embodiments, the computer system uses the hierarchy management tool 522 to generate a node tree structured in accordance with the relationship between each issuer entity and each other issuer entity. Each node of the node tree is associated with a respective issuer entity. The hierarchy management tool 522 incorporates the node tree within the hierarchically indexed multimedia database, such that the node tree is supported by the particular branch. In some embodiments, the computer system determines that video or audio stored on the particular branch of the hierarchically indexed multimedia database mismatches the particular industry. The hierarchy management tool 522 transfers the video or audio to a second branch of the hierarchically indexed multimedia database, wherein the video or audio matches a second industry associated with the second branch.

The cloud service 506 includes the host service 524, which refers to a Web-based or cloud-based hosting service that provides object storage using a scalable storage infrastructure through a Web service interface. Objects, which allow for uses such as storage for Internet applications, backup and recovery, disaster recovery, data archives, data lakes for analytics, and hybrid cloud storage can be stored.

The host storage 526 refers to a distributed relational database service running in the cloud for setup, operation, and scaling of the hierarchically indexed multimedia database for use in applications. In some embodiments, videos and metadata are kept private through configuring the host's storage and retrieval account settings. For example, in a particular implementation, YouTube has three video listing settings: Public, Private, and Unlisted. Public allows all users in YouTube to search for the video and see the video based on the video name/metadata. Private prevents any user except the owner and up to fifty authorized YouTube users from viewing the video or seeing the video in search results. Unlisted prevents users from seeing the video in search results, but allows users to view the video if they have the URL of the video. The Unlisted setting is sometimes used for each of the videos. Thus, the proprietary categorization information is only stored and available through the hierarchically indexed multimedia database, and no meta data besides the video name is passed to the multimedia content host 528. Thus, none of the proprietary categorization hierarchy data would be passed to the multimedia content host 528.

The multimedia content host 528 refers to an online video platform that enables users to view, download, upload, share videos, or live stream videos using the Internet. The multimedia content host 528 includes a video display service 530 and an analytics engine 532. The video display service 530 provides playback, interactive video tools, and a customizable player. In some embodiments, a home page provides videos and audio and links to videos (videos and list formats) and audio, such as news-related videos and audio of the day, industry videos and audio of the day, sector videos and sector audio of the day, group videos and audio of the day, videos and audio of a specific node level, product type, or service type, volume-related videos of the day, volume-related audio of the day, price-related videos of the day, price-related audio of the day, high-viewing activity videos, high listening activity audios, growth in rate of viewing activity of videos, or growth in rate of listening activity of audio.

The embodiments that are disclosed herein in connection with video apply as well to audio, for example, podcasts. Video and audio (podcasts, webcasts, management conference calls, webinars, etc.,) content is all subject to categorization within the hierarchy, video and audio trading alerts, video and audio thumbnails, video and audio cross indexing, video and audio correlated trading analysis, video and audio (podcast) trading alerts, and a self-building hierarchy for video and audio.

The analytics engine 532 provides built-in video viewing analytics of who is watching the videos, or listening to the audios, such as conference calls/podcasts (e.g., analysts, individual investors, portfolio managers, CEOs, C-level executives, competitors, recruiters, or vendors and suppliers to the company within an industry, sector, subsector, node level). The analytics engine 532 determines what is being watched/listened to (e.g., company video or audio, industry, such as aerospace, robotics, sector video or audio, subsector video or audio, or video or audio at node levels). The analytics engine 532 determines how many separate viewers or listeners are watching the videos or listening to the audio (e.g., by company, industry, sector, subsector, or node levels).

In some embodiments, the analytics engine 532 determines for how long they are watching it or listening to it (e.g., seconds, minutes, hours, days, weeks, months, or years). The analytics engine 532 determines how many times have they watched the same video or listened to the same audio about a particular company or a specific node level. The analytics engine 532 determines growth in number of viewers/listeners watching it or listening to it (e.g., last 15 minutes, 30 minutes, 45 minutes, last hour, 1, 2, 3, 4, 5, 6, 7, 8, 9, 10 hours, etc., last 24 hours, 1-30 days, month, quarter, week-to-date, month-to-date, year-to-date, or last 12 months). The analytics engine 532 determines how many times a user watched videos or audio about a particular industry, sector, subsector, or a node level. In some embodiments, video viewing activity (viewing metrics) and audio listening activity (audio metrics) is automatically recorded and correlated, including: who is watching/listening, what are they watching or listening to, how many viewers are watching it/listening to it, how long are they watching or listening, or how many times they are watching it or listening to it, at any node level.

In some embodiments, the computer system uses the analytics engine 532 to determine a second metric quantifying user engagement with multimedia content stored at a node of the hierarchically indexed multimedia database. The multimedia content and the node are each associated with the particular issuer entity of the multiple issuer entities, where the hierarchically indexed multimedia database categorizes the multiple issuer entities. In some embodiments, the computer system determines a multidimensional correlation of the first metric to the second metric. For example, the viewing and listening metrics are correlated to a security price change (stock/bond/any type of security), a trading volume/change in volume by security, a security price and volume changes of all public companies at a specific node level, security performance/change in performance of a composite (index/ETF etc.,) resulting from change in price performance of underlying companies that make up that index or ETF, etc., resulting from video viewing activity or audio listening activity, changes in money flow into/out of an industry, sector, group, sub-sector, or a node level, group and sector rotation, e.g., out of In-Vitro Fertility companies and into In Vivo Fertility, companies trend analysis, increase in funding of private companies currently conducting a financing that have posted videos and or audio to the platform and the correlation between number of views/viewers or listens/listeners to the progress of the private company's funding campaign. An exchange traded fund (ETF) is a type of security that tracks an index, sector, commodity, or other asset, but which can be purchased or sold on a stock exchange the same as a regular stock.

In some embodiments, video viewing and audio listening on the platform is determined based upon a multiplicity of metrics, which can be amount of video viewers/audio listeners, growth in viewers/listeners, and can also be time-based metrics with respect to video views and audio listens, and measuring these video viewing and audio listening metrics at the industry, sector, group, node level or company level. The system then simultaneously receives, warehouses, and measures engagement from the various social media platforms, sentiment from the social sentiment web sites and platforms, and messaging metrics, such as chat activity, chat frequency, growth in chat room populations.

The computer system ranks the particular issuer entity among the multiple issuer entities based on the multidimensional correlation. The computer system uses the hierarchy management tool 522 to update the node to include data describing a rank of the particular issuer entity among the multiple issuer entities based on the ranking. In some embodiments, the computer system displays a graphical user interface representing the multi-dimensional correlation (e.g., a bar chart of video watchers and audio listeners, a line chart of video watchers and audio listeners, regression analysis with two standard error bands across multiple time periods, or trend analysis by day, week, month, quarter, or year-to-date). In some embodiments, the computer system displays a graphical user interface representing histograms, scatter grams, pie charts, flow charts, binary tree charts, time lines, or area charts showing the multi-dimensional correlation.

In some embodiments, change in video and audio metrics are compared, which is measured at any node level, and which could be at the company level or industry, sector, sub-sector, group or any node level including company level, to the change in the social media engagement, e.g., Twitter or Facebook, and social sentiment indicators, e.g., Stocktwits, and messenger activity of a specific stock or general stock chat group, frequency change in chatter and other messenger metrics of the messenger apps, e.g., WhatsApp, Viber, etc. The computer system provides bi-directional and multi-directional correlations of the viewing/listening activity of the platform to the social media engagement, social sentiment indicators, and messenger app activity. Measurements and correlations are one to one, one to many, and many to many.

The system has a large selection of alerts that can be set based upon quantitative levels of views/listens, social engagements, social sentiment indicators, messenger activity and their correlations. The social media or social sentiment or messenger activity may be sourced directly from these sources or via an API, or from the company/issuer's social media or social sentiment or messenger app account which they have provided to us to access. For example, "Notification Alert: Send Alert to User via email and SMS/text when: Video Views or Audio Listens of XYZ Company increase by 100 within the last eight hours and social engagements," e.g., likes, increase by 1000 in the last twelve hours, positive social sentiment increases by 30% within the last four days, and messenger chatter activity in stock chat room increases by 50 people in the last week.

The analytics websites 534 refer to entities that provide stock analysis, financial analysis, brokerage recommendations, and bond credit ratings. In some embodiments, the computer system mines the analytics websites 534, using the machine learning module 518, to identify a change in a rating of the particular issuer entity. The rating is provided by the analytics websites 534 for multiple issuer entities. The computer system transmits the multimedia content and the change in the rating of the particular issuer entity to the multimedia content host 528 for storage at the identified node.

In some embodiments, trading, viewing, and listening alerts are created by setting alerts on parameters, e.g., who is watching the video or listening to the audio (competitor company, wall street analyst), what type of video are they watching, or audio are they listening to (e.g., company presentation, video about Food and Drug Administration (FDA) approval, video re proxy 14A, 14F), watching video or listening to audio at company level, industry level, sector level, node level, how many viewers are watching it/listeners are listening to it, how long (duration) are they watching or listening, how many times they are watching it or listening to it (company video, videos or company audio or multiple audios), security price change (stock, bond, any type of security), trading volume/change in volume by security, security price and volume changes of all public companies at a specific node level, or security performance/change in performance of a composite (index/ETF, etc.) resulting from change in price performance of underlying companies that make up that index or ETF, etc., resulting from video viewing activity or resulting from audio listening activity. FDA refers to the federal agency under the U.S. Department of Health and Human Services.

In some embodiments, trading, viewing, and listening alerts are created by setting alerts on parameters, e.g., changes in money flow into/out of an industry, sector, group, sub-sector, node level, group and sector rotation, e.g., out of In-Vitro Fertility companies and into In Vivo Fertility companies, correlation coefficient based alert, e.g., correlation coefficient of 0.95 of two public companies within two standard error bands over a six month period (e.g., a geometric increase in views of a video or listens of an audio of one company versus another company at the same node level or one node level above or below could trigger a pairs trade with one of the pair long and the other pair short, all precipitated from video views of the pairs), changes in viewing and listening activity as it relates to company and industry news, or technical analysis indicators correlated to viewing and listening activity and vice versa, e.g., moving averages, stochastics, etc.

In some embodiments, natural language processing, e.g., linguistics, computer science, and artificial intelligence and facial recognition/emotion recognition from the video or audio is used to predict confidence or lack thereof in company representations (e.g., operating results, earnings, cash flow, revenue, etc.), product launching on time, likelihood of closing a merger, management succession or lack thereof, confidence of completing a financing or lack thereof. A classification system for issuers and an alert system is provided by embodiments based on the issuer profile questionnaire used to enter an issuer's data into the hierarchically indexed multimedia database.

Figure 6:
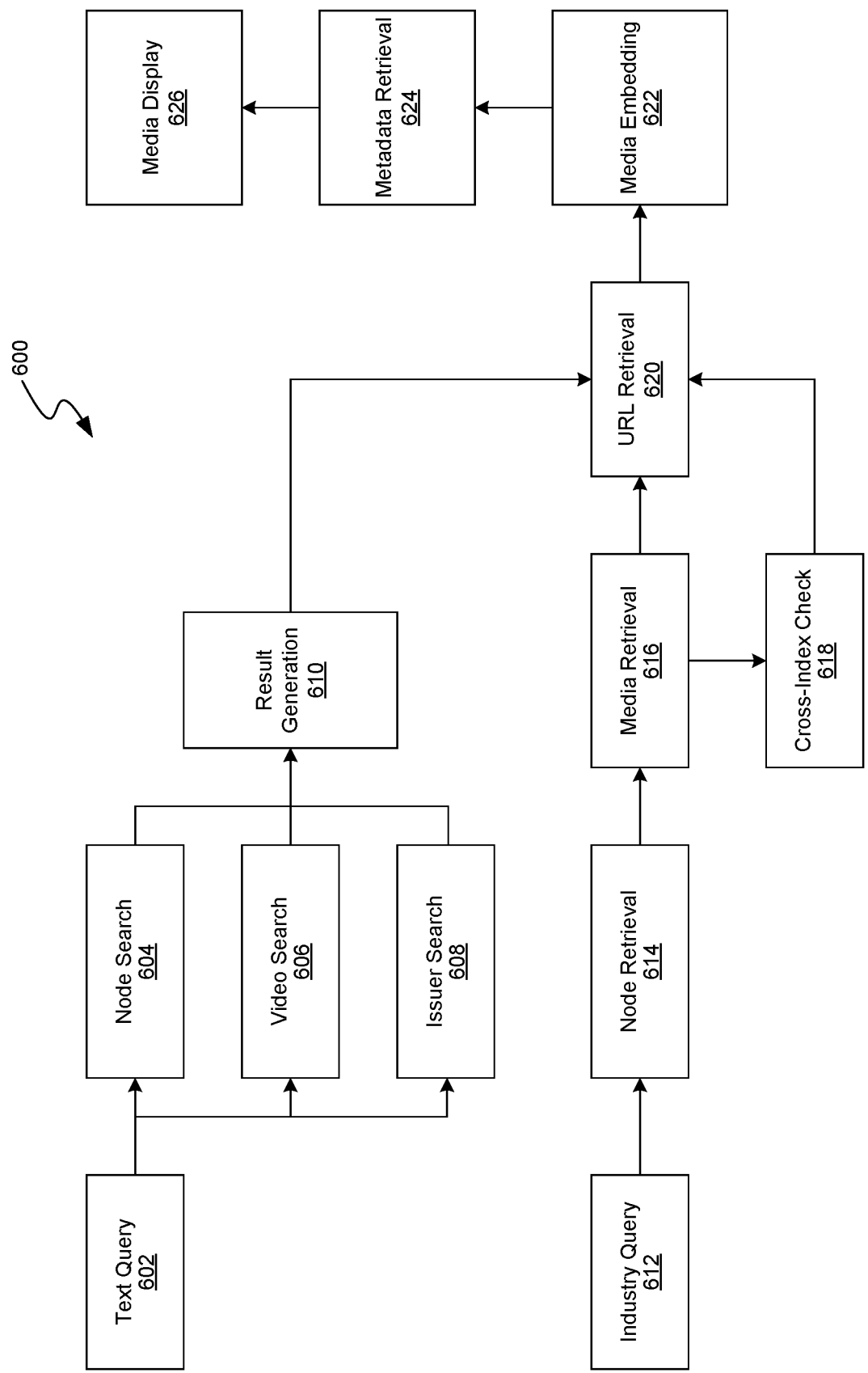
FIG. 6 is a flow diagram illustrating an example process for serving media on user query flow, in accordance with one or more embodiments.

FIG. 6 is a flow diagram illustrating an example process for serving media on user query flow, in accordance with one or more embodiments. The media is organized in a hierarchically indexed multimedia database. The hierarchically indexed multimedia database is the same as or similar to the hierarchically indexed multimedia database 206, illustrated and described in more detail with reference to FIG. 2. In some embodiments, the process 600 of FIG. 6 is performed by a computer system, e.g., the example computer system 1000 illustrated and described in more detail with reference to FIG. 10. Particular entities, for example, the hierarchically indexed multimedia database or a host service perform some or all of the steps of the process in other embodiments. Likewise, embodiments may include different and/or additional steps, or perform the steps in different orders. The host service is the same as or similar to the host service 524 illustrated and described in more detail with reference to FIG. 5.

The computer system receives (602) a combinatorial query from an investor entity that is searching for multimedia content based on text. In some embodiments, the computer system receives a combinatorial query from an issuer entity, referencing interactions with the multimedia content stored at a node. For example, the query is combinatorial to allow search on any and all parameters at once, as well as additional parameters that can include (when recently posted, last day, week, month, quarter, this calendar year, or date range) or price. In some embodiments, a data feed is provided for price change versus previous day, price performance for day, week, month, quarter, YTD, or market cap.

The computer system performs (604) a node search for node names in branches of the hierarchically indexed multimedia database. For example, a user search consists of text and dropdown selections, and each of the dropdown selections are used to narrow the results of the search and the text input is used to search across video names and descriptions. As videos are found which match the various criteria, their URLs and metadata are retrieved and shown to the user. The multimedia content host URLs and remote storage addresses are stored in the video table along with other video-specific information. When the system looks up a video, it also has access to these addresses. The multimedia content host is the same as or similar to the multimedia content host 528 illustrated and described in more detail with reference to FIG. 5.

The computer system performs (606) a video search for video titles and descriptions. In some embodiments, the investor-facing front end includes multiple text boxes joined together by Boolean operators to allow users to search for videos, audio files, or issuers based on AND/OR conditions. These text boxes act as search terms in addition to the dropdown selectors available in the screener tool. In some embodiments, the hierarchically indexed multimedia database provides front end users with the ability to search for companies and nodes that have identical strategic partners and overlapping or identical key suppliers/vendors, and overlapping or identical founders by company and node level, and provide the names and percentage overlapping or identical strategic partners and key suppliers/vendors and founders. Users also have the ability to run searches by correlation coefficient (in decimals or percentages) of overlapping or identical key partners and key vendors/suppliers and overlapping or identical founders.

The computer system performs (608) an issuer search for company names and competitor names. In some embodiments, during issuer signup, a database entry in the issuer table is populated along with all of the profile data associated with that company (e.g., name, company type, ticker symbol, etc.). Each company has a unique, system generated ID (Primary Key) associated with it, which is also used as a Foreign Key in the video table so that each video is associated with a company. When the computer system retrieves company/video data to show to the user, it can also lookup and retrieve the company profile data using these reference IDs (Primary/Foreign Keys) to see the relationships between entries in each table.

The computer system identifies (610) result nodes that fit the search criteria as well as cross-indexed nodes. In some embodiments when no result node is found, the computer system uses a hierarchy management tool to instantiates a new node in the hierarchically indexed multimedia database based on the combinatorial query. The new node is associated with an issuer entity. The hierarchy management tool stores the multimedia content at the new node. The hierarchy management tool is the same as or similar to the hierarchy management tool 522 illustrated and described in more detail with reference to FIG. 5.

The computer system receives (612) an industry query from an investor search based on industrial categorization, hierarchy, and other qualitative fields of the hierarchically indexed multimedia database. Investor users can search for and browse videos according to the hierarchy (industry categorization nodes) and video metadata (title, company, description, etc.). The computer system stores videos and tracks their hierarchical categorization in the reference table, which contains a record of the Video's ID (the Primary Key identifier for every video in the video table) and the HierarchyNodeID (the Primary Key identifier for every node in the industry categorization table). FIG. 6 illustrates an example of how the computer system returns media files/ companies based on investor text searches or by browsing the categorization hierarchies.

The computer system retrieves (614) child nodes of the hierarchically indexed multimedia database as the investor selects an industry and a sublevel of the hierarchically indexed multimedia database. In some embodiments, the computer system analyzes individual user usage of the hierarchically indexed multimedia database application. For issuers, the system analyzes data, such as video/podcast uploads, media questionnaires, issuer profile questionnaires, node associations, and user engagement to provide recommendations to improve issuer experience/success. The issuer profile questionnaire is the same as or similar to the issuer profile questionnaire 1100, illustrated and described in more detail with reference to FIG. 11. The media questionnaire is the same as or similar to the media questionnaire 1200, illustrated and described in more detail with reference to FIG. 12.

Recommendations can be displayed on a graphical user interface using a profile strength bar/meter showing the relative strength and/or completion of a profile, as well as the strength of the questionnaires and other uploaded files. Additional metrics used to incentivize following recommendations include issuer profile view counts, miscellaneous file view counts, product link view counts, search appearances for an issuer and for each of the issuer's uploaded media files. Investor recommendations include recommendations for profile completion, recommended issuers, industries, or issuer content based on a user's interests and previous activity (e.g., search history, viewing/listening history, file access history, or product link history).

The computer system retrieves (616) media and companies associated to nodes as each level is selected. The media is filtered based on qualitative criteria selected by the investor. In some embodiments, the hierarchically indexed multimedia database (referred to as an "issuerPixel database") returns data for security price changes, trading volume/changes, or security price and volume changes, and provides reports showing correlations and comparisons between these sets of data. Data sources for these include services such as finnhub.io and tiingo.com, which provides detailed trading information to recognize financial movement patterns as they relate to the IssuerPixel application's video and audio usage.

The computer system performs (618) a cross-index check to determine whether a result node is cross-indexed to another node. Videos from both nodes are displayed by a video display module, e.g., the video display module 530, illustrated and described in more detail with reference to FIG. 5. For example, the reference table is searched by the computer system based on the Video ID or the HierarchyNodeID, and enables multiple videos to be associated to a single categorization node and for a single video to be associated to multiple categorization nodes. Examples of these two cases are provided below, where video 5673 occurs twice in the table and is associated to two different nodes, indicating that the video has been categorized under two distinct categorizations, either within the same Industry or in separate industries. Additionally, hierarchy node 243 occurs twice in the table, indicating that two separate videos (46 and 5673) are both associated with this node.

| ReferenceID | VideoID (Foreign Key) | HierarchyNodeID (Foreign Key) |
|---|---|---|
| 51 | 46 | 243 |
| 52 | 5673 | 427 |
| 53 | 3432 | 139 |
| 54 | 5673 | 243 |

Each video is associated with an issuer who uploaded the video through a field in the video table that references the issuer's Primary Key. Each video has an issuer associated to it. Issuers are not deleted (they can be inactivated, but a record of them remain in the database), such that the system never loses data integrity. In addition to being associated with an issuer, the video is also associated directly to a company.

The computer system retrieves (620) a URL provided by the multimedia content host. The multimedia content host is the same as or similar to the multimedia content host 528 illustrated and described in more detail with reference to FIG. 5. The URL is associated to media objects associated to the result nodes. Once the system has determined which videos need to be retrieved based on a user's search criteria, the system looks up those video entries in the video table and then looks up the multimedia content host's URL associated to every video entry. This URL is pulled and then used in the front-end of the web application to embed the target video in the web app for viewing.

The computer system embeds (622) a media file thumbnail and a title in the results provided. For example, when the URL is pulled from the database, the URL is sent to the Web application where the software retrieves the video from the URL and embeds the video in the web page for viewing. The call made to retrieve the video from the URL may require sending credentials to the host service in order to access the video. If a user clicks on a specific media file, the computer system retrieves the media file metadata.

The computer system displays (626) a file details page, the media file using an embedded media file player, the metadata, and company data, etc. The media may be displayed using the video display module 503, illustrated and described in more detail with reference to FIG. 5. For example, the computer system displays a change in a rating of an issuer entity on a graphical user interface in response to a query referencing a result node. In another example, responsive to receiving a combinatorial query from an investor entity referencing a node tree, the computer system transmits a multidimensional correlation to the investor entity. The multidimensional correlation is described in more detail with reference to FIG. 5. In some embodiments, responsive to receiving a combinatorial query from an investor entity referencing a particular industry, the computer system displays a graphical user interface displaying a node tree associated with the industry to the investor entity.

In some embodiments, the computer system transmits investor activity to an issuer entity responsive to receiving a combinatorial query. For example, an analytics module can determine investor activity viewing multimedia content. The analytics module is the same as or similar to the analytics module 514 illustrated and described in more detail with reference to FIG. 5. The analytics module aggregates interactions of the investor entity with the multimedia content stored at the node into investor activity formatted in accordance with the structure of the hierarchically indexed multimedia database. In some embodiments, the computer system receives a combinatorial query from an investor entity referencing a node. The computer system transmits a rank of an issuer entity associated with the node, among the multiple issuer entities, to the investor entity in response to the combinatorial query. Ranking multiple issuer entities is described in more detail with reference to FIG. 5.

In some embodiments, the computer system analyzes and compares videos and audio against each other with respect to characteristics, such as views or listens. For example, the computer system can compare media using screening (screener page) characteristics including industry taxonomy-related, company characteristics, media type (e.g., vlog, etc.), reporting status, or research coverage type. The media can be compared based on the media questionnaire characteristics, social media characteristics, fundamentals (ratios and operating metrics), technicals (stock technical analysis), duration, subject matter (video/audio subject), or meta data. In some embodiments, a machine learning module is used to compare the media using association rule learning, a rule-based machine learning method for discovering relationships between variables in large databases. For example, the machine learning module uses rule-based machine learning to identify a set of relational rules that collectively represent the knowledge captured by the database. The rule-based machine learning approach includes learning classifier systems, association rule learning, and artificial immune systems.

FIG. 7 is a diagram illustrating an example graphical user interface displaying a hierarchy dashboard 700 for a self-building hierarchically indexed multimedia database, in accordance with one or more embodiments. The hierarchy dashboard 700 is presented in the form of the graphical user interface to an investor entity or an issuer entity. The hierarchically indexed multimedia database is the same as or similar to the hierarchically indexed multimedia database 206 illustrated and described in more detail with reference to FIG. 2.

In some embodiments, a computer system receives video or audio from an issuer entity. The computer system is the same as or similar to the example computer system 1000 illustrated and described in more detail with reference to FIG. 10. The computer system determines that the issuer entity belongs to an industry excluded from the multiple industries of the self-building hierarchically indexed multimedia database. The determining is performed using a machine learning module based on the video or audio. The computer system generates a new branch associated with the excluded industry. The computer system incorporates the new branch within the hierarchically indexed multimedia database as shown in FIG. 7. For example, the computer system generates a new node associated with the issuer entity and supported by the new branch. The computer system stores the video or audio at the new node. A suggestion box to edit nodes in the hierarchy can be displayed in different ways. In some embodiments a button is displayed next to each hierarchy node which, when clicked, shows a new popup window with the node's information (including direct ancestors of the node and the immediate child nodes of that node) along with the three request types of Add, Remove, or Edit and a textbox for the user to explain their request (see FIG. 7). Requests are tied to the user's profile.

In some embodiments, the industry hierarchies shown in FIG. 7 are used as a mechanism to create lead generation for sales of products and services of the issuer and further investment community visibility for the issuer, via the front end user, who is an investor or prospective product/service purchaser, who has direct access to the issuer via the platform's industry hierarchies, for both sales of products and services of the issuer and further investment community visibility for the issuer on a per transaction-per click basis. For example, an issuer profile questionnaire is modified to include a URL for the company's product/service sales department, email address for sales department, phone number for product/service sales/business development department, URL for a company's investor relations department, email address for company's investor relations contact, phone number for company's investor relations contact, or company credit information. The issuer profile questionnaire is the same as or similar to the issuer profile questionnaire 1100, illustrated and described in more detail with reference to FIG. 11.

In some embodiments, front-end users use industry hierarchies not only for investment research, but also for a company's product/service-related sales, via lead generation for the sales of its products/services (sales leads for the issuer) and providing direct access for investors to the issuer, providing the issuer with investment community visibility to the issuer. At any node level an investor/user can click a button to go to a company's URL for product/service sales, a company's email address, or call the company.

The investment community is also provided with a visibility-pay per click feature. At any node level, an investor/user can click a button to go to a URL for an issuer's investor relations department, an e-mail address for the company's investor relations contact, a phone number for the company's investor relations contact, etc. Each action transmits remuneration to the hierarchically indexed multimedia database 206 on a per-click basis, emanating from the hierarchy at the lowest node level. For example, a front-end user clicks on a "Flight Management Systems" node. The main flight management systems manufacturers (Honeywell International Inc. (U.S.), Thales Group (France), General Electric Company (U.S.), Leonardo-Finmeccanica S.p.A (Italy), Rockwell Collins (U.S.), Esterline Technologies (U.S.), and Garmin Ltd.) are listed. The user then clicks on any one of these companies. The user then has a choice. They can click on Videos or Audio. They can instead opt for: 1. Contact product sales; or 2. Contact investor relations. Then, they can select any one of the above "Click Actions." Each action charges the issuer on a per-click basis and initiates the selected action.

Referring to FIG. 7, the hierarchically indexed multimedia database application provides the following features. "Node Warp": a button next to a node or set of "Industry" level search results where the user can warp to a related node as suggested by the application (or administrators). This feature is useful in nodes that can fall within multiple industries (cross-indexed nodes or otherwise similar nodes). For example, if an issuer associated to a node in Medical Devices enters the Healthcare industry tree, and then goes to Medical Services→Medical Services (non-transport) →Transplant Surgery→Heart Transplant→Medical Devices, the application displays a button that allows that user to go to Medical Devices pertaining to Heart Transplants, within the Medical Device Industry tree. "Cross Indexing Notes for nodes": This feature allows administrators to add free-text notes to nodes. This is primarily intended to track cross-indexed nodes, but may also be used for other note taking purposes. "Search Text Box on Back End": to search nodes by name or ID. "Tracking and Logging for Duration for Issuer to go Through Questionnaire": The application will detect when the user lands on a page and when a form is submitted. Additionally, user input is tracked in fields even before the form is submitted. This allows the capture of more information from the user, such as user fall-off, partially input information, and general user flow through the issuer profile questionnaire. Greater insight into user behavior allows the issuer profile questionnaire to be adjusted in terms of content, layout and format so as to improve user retention. Additionally, the partially completed forms may be automatically saved when users leave or close the page so that the form is restored when users return to the same form. This improves a media questionnaire completion and video upload rates. The media questionnaire is the same as or similar to the media questionnaire 1200, illustrated and described in more detail with reference to FIG. 12.

In some embodiments, the hierarchically indexed multimedia database application provides the following features. "Duration Logging for Research Analysts Viewing Industry Hierarchy Pages": the application will periodically ping the browser to see if that page is still open, and will display a log of the duration spent on each industry page by user and timestamp. This feature, in addition to the logging of each node's creation by user and timestamp, will provide administrators with greater insight into hierarchy completion rates, problematic industry hierarchies, analyst efficiency and strengths, and rates of research improvement. "Allowing Administrators to Add and Remove 'Test' Companies to the System": for verification, the application is tested by adding companies to the system by going through the registration process in the development environment, including the issuer profile questionnaire for issuers and media questionnaires for media files. This will allow tests and ensure the web application is functioning as expected, as well as assuring the quality of the user experience for issuers.

In some embodiments, the hierarchically indexed multimedia database application provides the following features. "Front End—Boolean Logic Search": in addition to drop downs for front end user's searching of video and audio files. The investor-facing front end will include multiple text boxes joined together by Boolean operators to allow users to search for videos, audio files, or issuers based on AND/OR conditions. These text boxes may act as search terms in addition to the dropdown selectors available in the screener tool. "Issuer—User private chat functionality with issuer ('Issuer Online')": the application will include a real-time communication protocol between issuers and users (a chat feature). This communication protocol will mirror other common customer support chat protocols. The chat protocol will be an optional feature for issuers which will need to be activated either during issuer registration or in the issuer's preferences.

On the investor-facing front end, each registered front end user has access to communicate with the issuer through the chat popup window when they see/are notified "Issuer Online." Users can use this chat feature to ask questions and communicate privately with the representative of the issuer. This would create more investment community visibility for issuers so issuers can gather more prospective investors/users by creating more direct contact with them. Users can also search for companies where issuers representatives are online and available to chat. Additional methods to display to/notify users that issuers are online include adding a section on the home page highlighting industries/sectors where issuer representatives are online; and "Companies" section (on home page) where issuer representatives are online. This feature is considered a stretch goal post-launch.

In some embodiments, the hierarchically indexed multimedia database application provides the following features. "Analysis-Based Suggestions": an automated requests feature for issuers, using market data analysis and/or application data analysis to suggest what kind of content to post, metadata to add to existing content, and video characteristics/qualities to improve on. Requests may be made directly through the issuer dashboard or through email notifications, these requests may be directed en-masse to issuers based on platform wide data analysis. "Recommendation Engine": individually tailored recommendations for additional metadata, video files, and audio files based on system or administrator analysis for issuers and investor front-end users. The application will analyze individual user usage of the application. For issuers, the system will analyze data such as video/podcast uploads, media questionnaires, issuer profile questionnaires, node associations, and user engagement to provide recommendations to improve issuer experience/success. One method of displaying this recommendation is through a Profile strength bar/meter showing the relative strength and/or completion of their profile, as well as the strength of their issuer profile questionnaire and other uploaded files. Additional metrics to incentivize following recommendations include issuer profile view counts, file view counts, product link view counts, search appearances for the issuer and for each of the issuer's uploaded media files. Investor recommendations may include recommendations for profile completion, or recommended issuers, industries, or issuer content based on that user's interests and previous activity (e.g., search history, viewing/listening history, file access history, product link history).

In some embodiments, the hierarchically indexed multimedia database application provides the following features.

"Smart Searches Which Ignore 'Clutter' Terms": searches that include words like "company"/"companies" or other common phrases like "LLC" should accurately provide results without cluttering results with other companies that have the word "company" in the title. Some possible solutions to this issue include either fully ignoring these common words or performing two searches and merging their results, or performing a search with these exact results but ignoring other results based on these "clutter" words. "Utilize Natural Language Processing": the application will analyze the direct message traffic between issuers and investors via the chat feature. The application (or administrators) could then make requests to issuers about new video and audio files to post based on interest/need shown in chats. Investors will also be able to suggest to issuers the types of videos that they would like to see. This would encourage issuers to post more video and audio files to the platform.

In some embodiments, the hierarchically indexed multimedia database application provides the following features. "News Blog and RSS feeds": the platform (referred to as an "issuerPixel platform") includes a blog containing articles/posts written by authorized users and the site administrators. These blog posts improve site SEO and provide more value content for users of the site. In addition to adding content for site visitors, the aspect promotes features within the site or issuers who pay for such promotions (sponsored articles/promotions). In addition to the posts or articles generated by the issuerPixel application, the site contains an RSS feed pulling articles and/or news from other investor institutions and sources. This feed is curated by administrators so as to provide value relevant to issuers on platform and current market trends/investor interests. "Virtual Assistant": the issuerPixel application features a virtual assistant to facilitate communication with support tickets and sales appointments. This assistant integrates with the issuerPixel database's external CRM system to better organize customer interactions. "Provide Videography Company Suggestions": for issuers to facilitate easier and higher quality video production. The platform integrates with an advertising firm (on a commission basis) to get videography companies to be advertised on the recommended videographers list. This provides the benefits of: more videos from issuers around the globe, ad revenue from videography companies around the globe (without polluting the front end of the platform), improved media quality on platform, and additional awareness from various videography/audio production contacts.

In some embodiments, the hierarchically indexed multimedia database application provides the following features. "Front end users have the ability to suggest [via sending a submission to the research administrator just like with nodes] adding a company to a node level, at any node level, within any industry": users can request adding a company (issuer) at any node level. The issuer profile questionnaire includes additions to support this feature include Strategic Partners, Key Suppliers/Vendors, Company Founders, Company Executives. The database takes the strategic partner and key supplier/vendor and founder data and compares the data between all companies in all industries and at all node levels, seeking overlapping (identical) partners and identical key suppliers/vendors and founder(s). The database provides front end users with the ability to search for companies and nodes that have identical strategic partners, overlapping or identical key suppliers/vendors, and overlapping or identical founders by Company and node level, and provide the names and percentage overlapping or identical strategic partners, key suppliers/vendors, and founders. Users also have the ability to run searches by correlation coefficient (in decimals or percentages) of overlapping or identical key partners, key vendors/suppliers, and founders.

In some embodiments, the hierarchically indexed multimedia database application provides issuers with the ability to add transcript files which the system will process using text-to-speech algorithms into audio files for user consumption. Issuers choose whether or not to convert the transcript to audio upon upload, and if they choose to do so the issuer then fills out the media questionnaire for the transcript file. The web application mines the SEC and other data sources for transcript files to be added to the database for companies. These files may be converted into audio files depending on whether it is deemed appropriate to do so.

Figure 8:
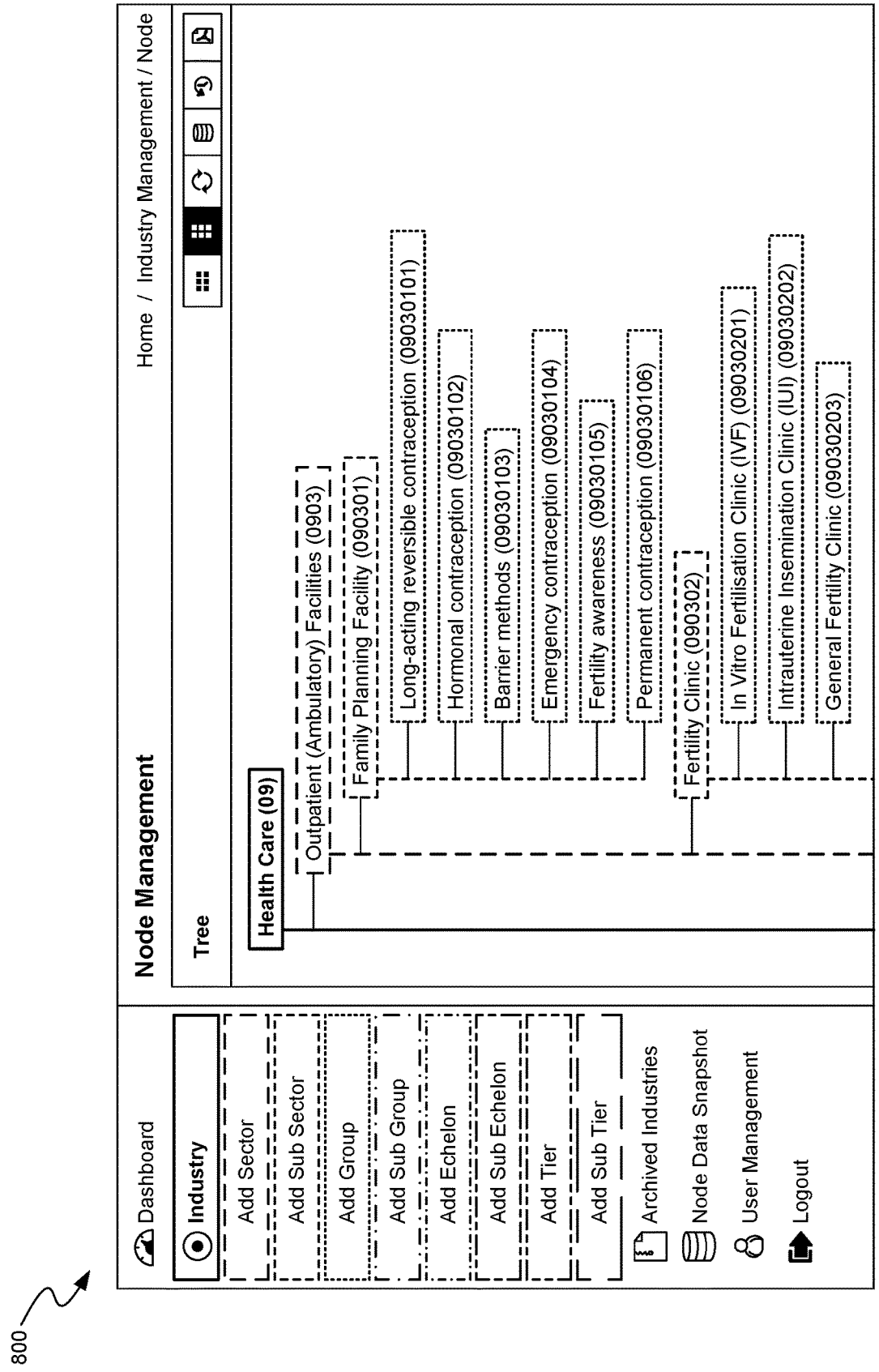
FIG. 8 is a diagram illustrating an example graphical user interface displaying a hierarchy of a self-building hierarchically indexed multimedia database, in accordance with one or more embodiments.

FIG. 8 is a diagram illustrating an example graphical user interface displaying a portion 800 of a hierarchy of a self-building hierarchically indexed multimedia database, in accordance with one or more embodiments. The hierarchically indexed multimedia database is the same as or similar to the hierarchically indexed multimedia database 206 illustrated and described in more detail with reference to FIG. 2. The portion 800 of the hierarchy is displayed on a graphical user interface of the hierarchically indexed multimedia database application.

In some embodiments, the hierarchy tree includes nineteen levels (including "Industry"), and can be expanded to include more levels. Each level includes one or more nodes, which in turn include a description, a status, and parent/child relationships. Nodes can have one or more children, and also have a parent (except "Industry" nodes) but can be replicated under more than one parent. Child nodes can be created under any node except the bottom-most layer, and can be associated to any parent node on the same level. Parent-child relationships can also be created or removed at any time between existing adjacent layer nodes. Each replicated node is considered a new, unique node in that it has its own unique ID and can be altered independent of other versions of the same replicated node.

In some embodiments, the graphical user interface of the hierarchically indexed multimedia database application drives the following functionality. "Expand/Collapse Node's Children": clicking this button will expand or collapse the immediate children nodes of this node. "Cross-Indexed Nodes" (including icon): allows the user to cross-index a node with another node in a separate industry. This creates a relationship between two nodes which the computer system uses to understand that the two nodes can be treated as equivalent and interchangeable, so that issuers and media files associated to one cross-linked node would also appear as being associated to the twin-linked node. Cross-Indexed nodes are marked with a chain-linking icon on the node in the hierarchy tree. Users can view which nodes a selected node is linked to in the cross-indexed details, and may add more than one cross-indexed node association at once. "Description": node values consist of text input, which is automatically formatted so that the first letter is always capitalized, and all following characters keep the case formatting as input. Node values are unique to that level, meaning if a duplicate node value is entered in the same level as an existing node, then that node will not be created and the user will be notified.

In some embodiments, the graphical user interface of the hierarchically indexed multimedia database application drives the following functionality. "Note": allows users to add admin-only viewable and editable text. The purpose of this note field is to track cross-indexed node requests from the research analyst team, and can be used for general note taking purposes as well. Nodes with note fields have a comment bubble icon in their node visible on the hierarchy tree screen. "Status": nodes can be marked as active/inactive; inactive nodes are hidden from non-administrative users and will eventually be deleted. Industry trees can be activated or inactivated; inactive trees are moved to a separate view to prevent clutter. Administrative users with the appropriate permissions can change the status at will at any time. "Delete Node": delete node allows users to permanently delete a node; doing so also deletes all nodes underneath the target node. "Move": allows user to move target node and all sub-nodes to becoming a child node destination node which is selected through a search dropdown (using Name and ID). "Duplicate as Industry": allows user to duplicate targeted node to a new industry, so that the target node becomes an industry level node and all childnodes are moved along with the node to their appropriate new levels (the sub-tree structure is maintained during move). "Copy Child Nodes": allows user to copy any selection of a target node's child nodes to be pasted underneath a destination parent node. This does not remove the original child nodes. "Update": allows user to save any changes made to target node (e.g., description change), status change, associated parent/child nodes. "Select All" (parent/child node checkbox selection): allows the user to select all child or all parent nodes.

In some embodiments, the graphical user interface of the hierarchically indexed multimedia database application drives the following functionality. "Mass Node Create" (separated by semi colon): clicking an "Add <Industry Level>" button will allow users to add a node at that level, while selecting one or more parent nodes. Users can create multiple nodes at once by separating each new node with a semicolon. "Expand/Collapse All": allows users to expand or collapse all nodes in the industry hierarchy tree at once. "Portrait/Landscape": allows users to change the orientation of the industry hierarchy tree from top down to left right and back again. "Refresh": allows the user to refresh the page so as to show the latest changes in the industry tree. "Save/Restore Backup": industry node trees can be individually saved (up to ten saves per tree) and a saved version of a tree can be loaded at any time. Loading a save will overwrite existing tree data.

In some embodiments, the graphical user interface of the hierarchically indexed multimedia database application drives the following functionality. "Generate PDF": generates a PDF version of the industry node tree showing all nodes of the tree. The displayed tree will match the current orientation of the industry tree. "Zoom In/Out": allows the user to zoom in or out on the industry hierarchy tree without effecting the rest of the page. "Search Nodes": allows the user to search all of the nodes within the current industry tree by description and ID. This feature will display a list of result nodes and allow the user to select a result to jump to that node in the tree. "Automated DB Backup": system automatically backs up the entire DB on a weekly basis and stores the snapshots where a developer can restore it if needed. This requires direct database access to restore a previous version. "Node Change Logging": node creation is tracked according to who made the node and the timestamp of the node creation. "Analyst Time Spent on Hierarchy View": the system tracks the amount of time an analyst user has spent viewing a specific webpage according to when they started viewing the page and when they stopped. This is tracked by having the page periodically ping the server for as long as the page is open, so the server logs when the page was initially opened and for how long it was open. This log is visible in the administrative portal to users with the appropriate privileges. "Load Optimization": the system has been optimized to load up to 40K nodes in a single hierarchy tree without crashing a web browser.

In some embodiments, the graphical user interface of the hierarchically indexed multimedia database application drives the following functionality. "Checkbox": adding a checkbox next to each node in the hierarchy tree, with administrative users able to check multiple nodes at once and then select an action at the top of the tree to apply that action to the entire selection of nodes at once. Actions include Delete, Move, and Copy. Another button for "clear selection" will remove any selected nodes. "Add Company to Nodes": administrators will be able to add companies directly to nodes with some subset of metadata to uniquely identify the company. Administrators can view what companies are in the system and what nodes they are associated to, as well as what companies are associated to each node in the node details of the hierarchy tree. Issuers will be able to view their existing company profile on signup and be able to choose to "claim" that company during the signup process. "Drag and Click Nodes": administrators can click a node and drag it to another place within the same hierarchy tree. The administrator can connect and disconnect nodes together (in terms of parent/child relationships). The computer system can also detect if a connection should exist if a user drags a node on top of a line connecting an existing parent/child pair and insert itself as an additional node in between the parent and child, separating parent and child nodes while forming new relationships. The existing parent node becomes a parent node of the selected node, and the existing child node becomes a child of the selected node. Users can choose to click and drag an entire subtree. Users can connect subtrees back to the hierarchy tree by drawing a parent/child relationship between the top of the subtree and any desired parent node. This effectively "moves" the subtree underneath a target node location.

An example process of the self-building executes as follows. A Fertilization node exists under the Healthcare Industry but there are not any nodes below it in Healthcare. An issuer entity or user can enter the Medical Device industry hierarchy (see FIG. 7) and generate, or submit for approval, two nodes below Fertilization consisting of In Vitro Fertilization and In Vivo Fertilization. The entries are approved by the computer system and the hierarchically indexed multimedia database then performs the follow two actions automatically. First, the hierarchically indexed multimedia database adds the two nodes to the Medical Device industry hierarchy. Second, the hierarchically indexed multimedia database automatically recognizes the path in the Healthcare industry hierarchy and creates the two nodes under Fertilization of In Vitro Fertilization and In Vivo Fertilization.

In some embodiments, after the system makes the change, it alerts the computer system to perform verification. There are, thus, three methods for hierarchy building: automatic self-building hierarchy, service administration, and user requests, which can occur from one or more users simultaneously on the platform. For example, an issuer loads a video for their company under: Healthcare→Outpatient Facilities→Fertility Clinics→In Vivo Fertilization→Company. The database automatically populates the same video of the same company at the same node level with the same name called In Vivo Fertilization under a different industry in the hierarchy; in this case, the medical device industry. Thus unsupervised cross-indexing of videos throughout the hierarchies is performed. There are some industries where a company is providing a service and a product or there is a product that is facilitating a service by them or others. In this example, the service is under Healthcare and the product is under Medical Device. The feature is significant in solving the technical problem of unsupervised cross-indexing.

Figure 9:
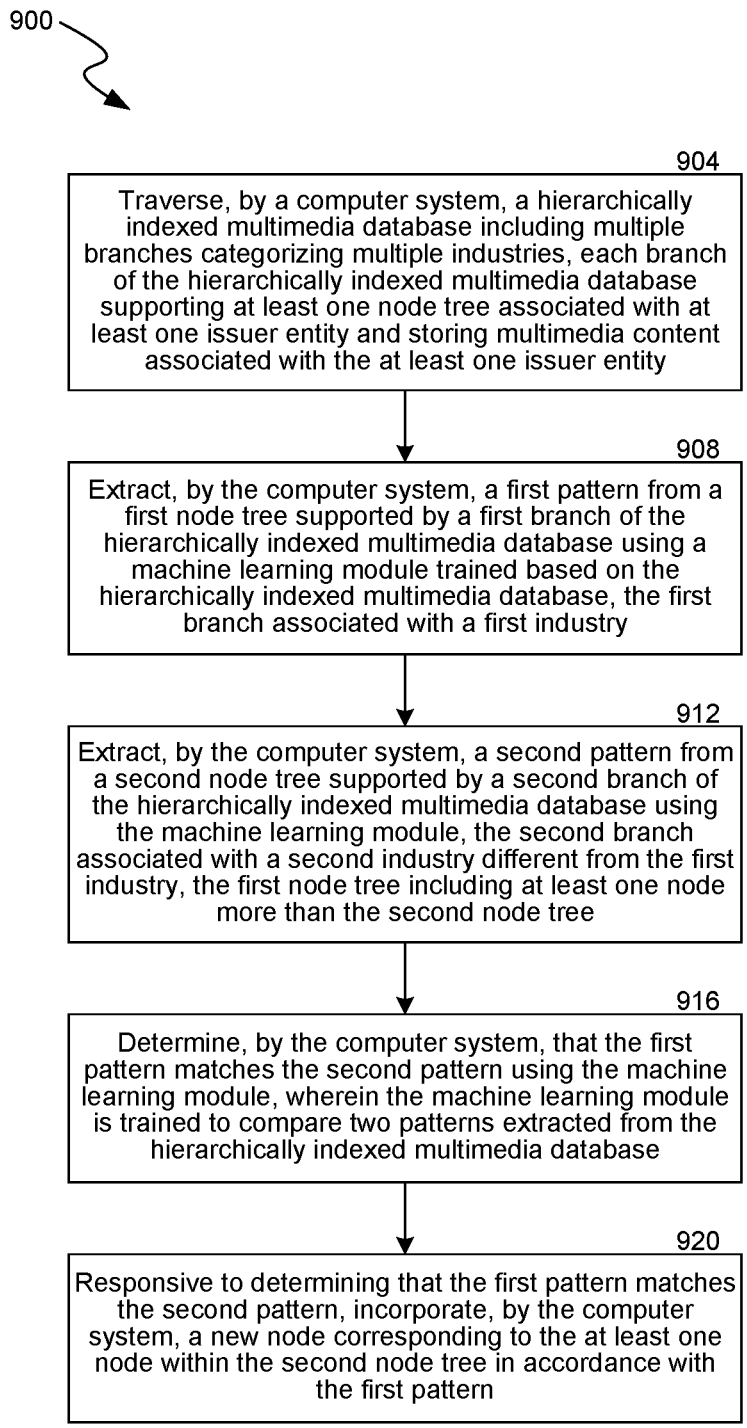
FIG. 9 is a flow diagram illustrating an example process for self-building hierarchically indexed multimedia databases, in accordance with one or more embodiments.

FIG. 9 is a flow diagram illustrating an example process for self-building hierarchically indexed multimedia databases, in accordance with one or more embodiments. The hierarchically indexed multimedia database is the same as or similar to the hierarchically indexed multimedia database 206, illustrated and described in more detail with reference to FIG. 2. In some embodiments, the process of FIG. 9 is performed by a computer system, e.g., the example computer system 1000 illustrated and described in more detail with reference to FIG. 10. Particular entities, for example, the hierarchically indexed multimedia database or a host service perform some or all of the steps of the process in other embodiments. Likewise, embodiments may include different and/or additional steps, or perform the steps in different orders. The host service is the same as or similar to the host service 524 illustrated and described in more detail with reference to FIG. 5.

The computer system traverses (904) the hierarchically indexed multimedia database, which includes multiple branches categorizing multiple industries. Each branch of the hierarchically indexed multimedia database supports at least one node tree associated with at least one issuer entity and stores multimedia content associated with the at least one issuer entity. In some embodiments, a group of a parent node, direct child node, and direct grandchild node is called a branch. When two branches have significant naming or description overlap with another industry, a cross-index relationship is indicated between these branches. Branches can be cross-indexed more than once. Branch sizes may vary, with larger matching branches having a stronger suggested correlation than smaller branches.

The computer system extracts (908) a first pattern from a first node tree supported by a first branch of the hierarchically indexed multimedia database, using a machine learning module, trained based on the hierarchically indexed multimedia database. The machine learning module is the same as or similar to the machine learning module 518 illustrated and described in more detail with reference to FIG. 5. The first branch is associated with a first industry. Using automated self-building, the hierarchically indexed multimedia database (referred to as an "issuerPixel database") automatically detects patterns within the node trees and determines whether patterns match closely enough to suggest replicating additional nodes from one pattern to the other.

The computer system extracts (912) a second pattern from a second node tree supported by a second branch of the hierarchically indexed multimedia database using the machine learning module. The second branch is associated with a second industry different from the first industry. The first node tree includes at least one node more than the second node tree. The machine learning module is the same as or similar to the machine learning module 518 illustrated and described in more detail with reference to FIG. 5. The machine learning module encapsulates a specific machine learning algorithm, function, or code library that builds a model based on sample data, known as "training data," in order to make predictions or decisions without being explicitly programmed to do so. The machine learning module 518 applies machine learning techniques to generate a machine learning model that, when applied to extracted features, outputs indications of whether the features have an associated property.

The computer system determines (916) that the first pattern matches the second pattern using the machine learning module. The machine learning module is trained to compare two patterns extracted from the hierarchically indexed multimedia database. For example, For example, if Branch A (a chain of directly related nodes) contains four nodes, and three of the node names closely match (e.g., greater than 98% word similarity) three nodes of the same relationship pattern in another industry's Branch B, the computer system would then indicate adding the fourth node from A to B in the same position. The computer system can search for patterns using multiple weighted criteria, which can be adjusted. Other criteria which may be used to evaluate and determine if nodes should be added are whether two industries share many cross-indexed nodes, or if the system has previously suggested adding nodes from one to the other and those requests were accepted by an administrator.

Responsive to determining that the first pattern matches the second pattern, the computer system incorporates (920) a new node corresponding to the at least one node within the second node tree in accordance with the first pattern. In addition to the above methods of building the hierarchy, the issuerPixel application also allows investors and issuers (company users) to provide requests in the hierarchy that are then implemented. Users are able to submit requests to add, edit, and subtract nodes to the hierarchy through a suggestion box available for every node they can see within the hierarchy tree views allowed to them. For issuers, the hierarchy tree would show in an issuer profile questionnaire and in a media questionnaire. The issuer profile questionnaire is the same as or similar to the issuer profile questionnaire 1100, illustrated and described in more detail with reference to FIG. 11. The media questionnaire is the same as or similar to the media questionnaire 1200, illustrated and described in more detail with reference to FIG. 12. For investors, the hierarchy tree would show in their homepage and video browsing/search pages, where they would be able to browse through the hierarchy or search based on the hierarchy accordingly.

Figure 10:
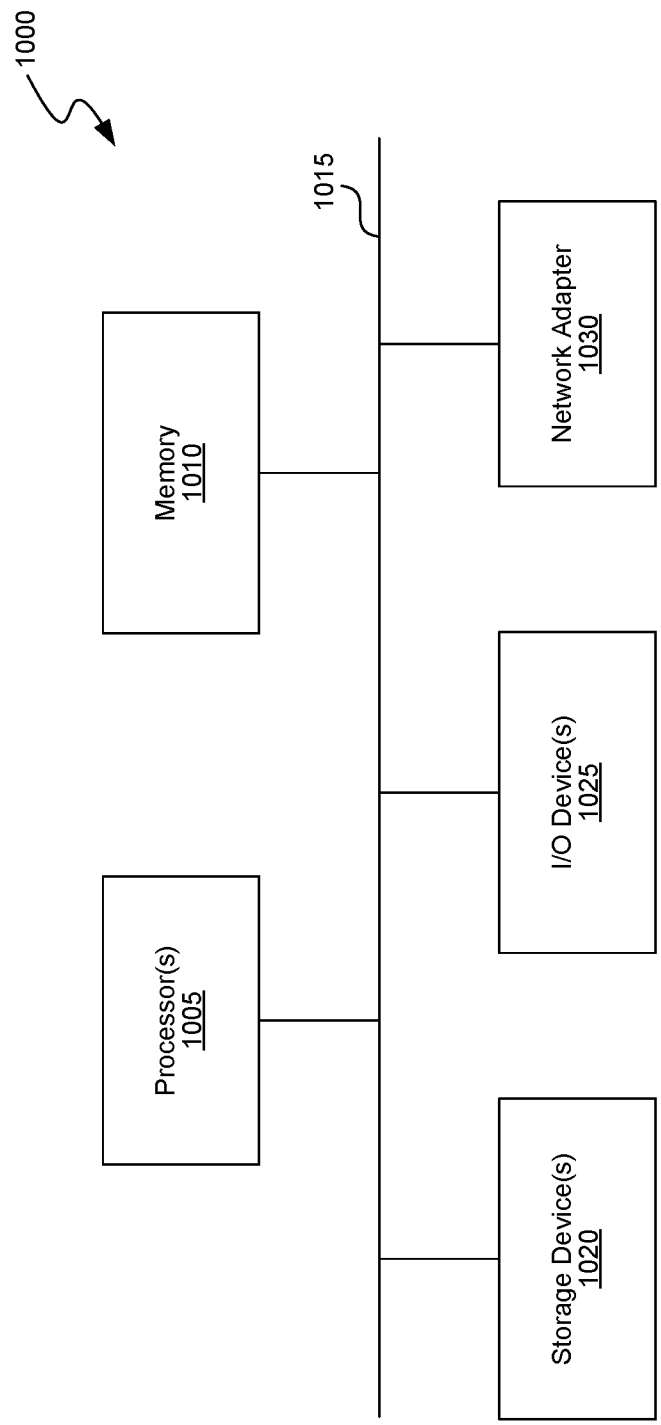
FIG. 10 is a block diagram illustrating an example computer system, in accordance with one or more embodiments.

FIG. 10 is a block diagram illustrating an example computer system 1000, in accordance with one or more embodiments. In some embodiments, the computer system 1000 is a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

In some embodiments, the computer system 1000 includes one or more central processing units ("processors") 1005, memory 1010, input/output devices 1025, e.g., keyboard and pointing devices, touch devices, display devices, storage devices 1020, e.g., disk drives, and network adapters 1030, e.g., network interfaces, that are connected to an interconnect 1015. The interconnect 1015 is illustrated as an abstraction that represents any one or more separate physical buses, point to point connections, or both connected by appropriate bridges, adapters, or controllers. In some embodiments, the interconnect 1015 includes, for example, a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus, also called Firewire.

In some embodiments, the memory 1010 and storage devices 1020 are computer-readable storage media that store instructions that implement at least portions of the various embodiments. In addition, in some embodiments, the data structures and message structures are stored or transmitted via a data transmission medium, e.g., a signal on a communications link. Various communications links can be used, e.g. the Internet, a local area network, a wide area network, or a point-to-point dial-up connection. In some embodiments, the computer readable media include computer-readable storage media, e.g., non-transitory media, and computer-readable transmission media.

In some embodiments, the instructions stored in memory 1010 are implemented as software and/or firmware to program the processor 1005 to carry out actions described above. In some embodiments, such software or firmware are initially provided to the computer system 1000 by downloading it from a remote system through the computer system 1000, e.g., via network adapter 1030. The various embodiments introduced herein can be implemented by, for example, programmable circuitry (e.g., one or more microprocessors) programmed with software and/or firmware, or entirely in special purpose hardwired (non-programmable) circuitry, or in a combination of such forms. Special-purpose hardwired circuitry may be in the form of, for example, one or more ASICs, PLDs, FPGAs, etc.

FIG. 11 is a diagram illustrating an example graphical user interface displaying an issuer profile questionnaire 1100, in accordance with one or more embodiments. The example issuer profile questionnaire 1100 illustrated in FIG. 11 can include drop-down entries categorizing the company name, entity type—organizational structure, name of individual completing the questionnaire, e-mail address of individual completing the questionnaire, URL for company's sales department, e-mail address of company's sales department, phone number for product/service sales/business development department, URL for company's investor relations department, or e-mail address of company's investor relations contact for an issuer entity. The example issuer profile questionnaire 1100 can further include drop-down entries categorizing a phone number for company's investor relations contact, the company founders, CEO, strategic partnerships, public or private company type, base currency, legal entity type, public trading and reporting status, audited financials, patents, or analyst rating for an issuer entity.

FIG. 12 is a diagram illustrating an example graphical user interface displaying a media questionnaire 1200, in accordance with one or more embodiments. The example media questionnaire 1200 illustrated in FIG. 12 can include drop-down entries categorizing the industry, sector, sub sector, group, sub group, echelon, sub echelon, tier, and sub tier for a video upload. The example media questionnaire 1200 can further include drop-down entries categorizing the video title, date of video publication, video presenter, type of video, media sub type, subject of company video, video description, recent road shows, investment bank hosted road show, name of investment bank, and top competitors for a video upload.

In alternative embodiments, a computer system receives a request to modify a node of a hierarchically indexed multimedia database categorizing multiple issuer entities. The request is received from an investor entity or an issuer entity of the multiple issuer entities. The hierarchically indexed multimedia database includes at least one branch associated with a respective industry and supports a node tree including the node. The computer system extracts features indicative of a priority of the request. The features are extracted from the request, other requests received to modify the node, and a structure of the hierarchically indexed multimedia database. The computer system determines the priority of the request based on the features using a machine learning module trained based on the structure of the hierarchically indexed multimedia database and the other requests. The computer system partitions the request within the other requests based on the priority. The computer system modifies the node tree with respect to the structure of the hierarchically indexed multimedia database, such that the request to modify the node is satisfied. The computer system transmits a response to the investor entity or the issuer entity of the multiple issuer entities. The response indicates that the request to modify the node is satisfied.

In some embodiments, the features include a position of the node in the structure of the hierarchically indexed multimedia database.

In some embodiments, a computer system receives issuer profile questionnaires describing multiple issuer entities. The computer system generates a hierarchically indexed multimedia database categorizing the multiple issuer entities based on the issuer profile questionnaires. The hierarchically indexed multimedia database includes at least one branch associated with a respective industry and supports at least one node. The at least one node references at least one issuer entity of the multiple issuer entities. The computer system extracts metadata using a machine learning module from multimedia content received from the at least one issuer entity. The metadata is indicative of the respective industry. The computer system identifies the at least one node using the machine learning module based on the metadata. The machine learning module is trained based on a structure of the hierarchically indexed multimedia database. The computer system stores the multimedia content at the at least one node, such that the multimedia content is associated with the respective industry and the at least one issuer entity. The computer system aggregates interactions of at least one investor entity with the multimedia content stored at the at least one node into investor activity formatted in accordance with the structure of the hierarchically indexed multimedia database. The computer system transmits the investor activity to the at least one issuer entity.

In some embodiments, the computer system receives a combinatorial query, from the at least one issuer entity, referencing the interactions with the multimedia content stored at the at least one node. Transmitting the investor activity to the at least one issuer entity is performed responsive to receiving the combinatorial query.

In some embodiments, a computer system receives multimedia content from a particular issuer entity of multiple issuer entities categorized by a hierarchically indexed multimedia database stored by a multimedia content host. The hierarchically indexed multimedia database includes at least one node referencing the particular issuer entity. The computer system mines analytics websites using a machine learning module to identify a change in a rating of the particular issuer entity. The rating is provided by the analytics websites for the multiple issuer entities. The computer system traverses the hierarchically indexed multimedia database using the machine learning module based on the multimedia content to identify the at least one node. The computer system transmits the multimedia content and the change in the rating of the particular issuer entity to the multimedia content host for storage at the at least one node.

The computer system receives a URL from the multimedia content host referencing the multimedia content and the change in the rating stored at the at least one node. The computer system receives a combinatorial query from an investor entity requesting the multimedia content. Responsive to receiving the query, the computer system displays the multimedia content and the change in the rating of the particular issuer entity using the URL on a graphical user interface.

In some embodiments, a computer system determines a first metric quantifying user engagement with multimedia content stored at a node of a hierarchically indexed multimedia database. The multimedia content and the node are each associated with an issuer entity of multiple issuer entities. The hierarchically indexed multimedia database categorizes the multiple issuer entities. The computer system determines a second metric quantifying social media engagement, communication network activity, a trading volume, and a stock value associated with the issuer entity. The computer system determines a multidimensional correlation of the first metric to the second metric. The computer system ranks the issuer entity among the multiple issuer entities based on the multidimensional correlation. The computer system updates the node to include data describing a rank of the issuer entity among the multiple issuer entities based on the ranking. The computer system receives a combinatorial query from an investor entity referencing the node. The computer system transmits the rank of the issuer entity among the multiple issuer entities to the investor entity in response to the combinatorial query.

In some embodiments, the computer system mines the Internet to aggregate changes in the social media engagement, the communication network activity, the trading volume, and the stock value associated with the first issuer entity. Determining the second metric is based on the changes.

In some embodiments, determining the second metric includes triangulating between the social media engagement, the communication network activity, the trading volume, and the stock value associated with the first issuer entity.

In some embodiments, the social media engagement includes at least one of a social sentiment API feed or a social sentiment indicator.

In some embodiments, the communication network activity includes at least one of instant messaging activity, instant messaging frequency, or a chat room population.

In some embodiments, prior to determining the first metric, the computer system instantiates a node in the hierarchically indexed multimedia database based on the combinatorial query. The node is associated with the issuer entity. The computer system stores the multimedia content at the node.

In some embodiments, a computer system mines the Internet for multimedia content associated with multiple industries using a machine learning model trained using features indicative of at least a particular industry of the multiple industries. The multiple industries are categorized by a hierarchically indexed multimedia database including multiple branches including a particular branch associated with the particular industry. The computer system clusters the multimedia content among multiple issuer entities of the particular industry using deep learning. The deep learning is configured to determine a relationship from the multimedia content between each issuer entity of the multiple issuer entities and each other issuer entity of the multiple issuer entities. The computer system generates a node tree structured in accordance with the relationship between each issuer entity of the multiple issuer entities and each other issuer entity of the multiple issuer entities. Each node of the node tree is associated with a respective issuer entity of the multiple issuer entities. The computer system incorporates the node tree within the hierarchically indexed multimedia database, such that the node tree is supported by the particular branch. Responsive to receiving a combinatorial query from an investor entity referencing the particular industry, the computer system generates a graphical user interface displaying the node tree to the investor entity.

In some embodiments, the particular branch is a first branch and the particular industry is a first industry. The method further includes determining, by the computer system, that video or audio stored on the first branch of the hierarchically indexed multimedia database mismatches the first industry. The computer system transfers the video or audio to a second branch of the hierarchically indexed multimedia database. The video or audio matches a second industry associated with the second branch.

The description and drawings herein are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of 1 this invention and that various modifications may be implemented by those skilled in the art.

What is claimed is:
1. A method comprising:
  mining, by a computer system, the Internet for multimedia content associated with a plurality of industries categorized by a hierarchically indexed multimedia database comprising a plurality of branches, each branch of the plurality of branches associated with a respective industry of the plurality of industries;

clustering, by the computer system, the multimedia content among a plurality of issuer entities associated with the hierarchically indexed multimedia database, wherein clustering the multimedia content comprises determining a relationship, from the multimedia content, between each issuer entity of the plurality of issuer entities and each other issuer entity of the plurality of issuer entities;

determining, by the computer system, that the multimedia content is associated with an industry and an issuer entity, the industry excluded from the plurality of industries, the determining performed using machine learning based on the multimedia content;

generating, by the computer system, a branch associated with the industry excluded from the plurality of industries and a node associated with the issuer entity and supported by the branch;

storing, by the computer system, the multimedia content at the node associated with the issuer entity;

modifying, by the computer system, the hierarchically indexed multimedia database by incorporating the branch associated with the industry excluded from the plurality of industries within the hierarchically indexed multimedia database;

generating, by the computer system, a node tree structured in accordance with the relationship between each issuer entity of the plurality of issuer entities and each other issuer entity of the plurality of issuer entities, each node of the node tree associated with a respective issuer entity of the plurality of issuer entities; and incorporating, by the computer system, the node tree within the hierarchically indexed multimedia database, such that the node tree is supported by the branch.

2. The method of claim 1, wherein mining the Internet for the multimedia content is performed using a machine learning model trained using features indicative of at least a particular industry of the plurality of industries, the plurality of branches including a particular branch associated with the particular industry.

3. The method of claim 1, wherein the plurality of issuer entities comprises the issuer entity.

4. The method of claim 1, further comprising generating, by the computer system, a graphical user interface displaying the branch associated with the industry excluded from the plurality of industries within the hierarchically indexed multimedia database in response to receiving a combinatorial query from an investor entity referencing the industry.

5. The method of claim 1, wherein the branch associated with the industry excluded from the plurality of industries is a first branch and the industry excluded from the plurality of industries is a first industry, the method further comprising:

determining, by the computer system, that video or audio stored on the first branch mismatches the first industry; and transferring, by the computer system, the video or audio to a second branch of the hierarchically indexed multimedia database, wherein the video or audio matches a second industry associated with the second branch.

6. The method of claim 1, wherein the branch associated with the industry excluded from the plurality of industries is a first branch and the industry excluded from the plurality of industries is a first industry, the method further comprising:

extracting, by the computer system, a pattern from a second branch of the hierarchically indexed multimedia database, the second branch associated with a second industry associated with the first industry, wherein generating the first branch and the node associated with the issuer entity is performed based on the pattern.

7. The method of claim 1, further comprising:

receiving, by the computer system, issuer profile questionnaires describing a plurality of issuer entities associated with the plurality of industries; and constructing, by the computer system, the hierarchically indexed multimedia database categorizing the plurality of industries based on the issuer profile questionnaires.

8. A computer system comprising:

a computer processor; and a non-transitory computer-readable storage medium storing computer instructions, which when executed by the computer processor cause the computer system to:

mine the Internet for multimedia content associated with a plurality of industries categorized by a hierarchically indexed multimedia database comprising a plurality of branches, each branch of the plurality of branches associated with a respective industry of the plurality of industries;

cluster the multimedia content among a plurality of issuer entities associated with the hierarchically indexed multimedia database, wherein clustering the multimedia content comprises determining a relationship, from the multimedia content, between each issuer entity and each other issuer entity of the plurality of issuer entities;

determine that the multimedia content is associated with an industry and an issuer entity, the industry excluded from the plurality of industries, the determining performed using machine learning based on the multimedia content;

generate a branch associated with the industry excluded from the plurality of industries and a node associated with the issuer entity and supported by the branch;

store the multimedia content at the node associated with the issuer entity;

modify the hierarchically indexed multimedia database by incorporating the branch associated with the industry excluded from the plurality of industries within the hierarchically indexed multimedia database;

generate a node tree structured in accordance with the relationship between each issuer entity and each other issuer entity of the plurality of issuer entities, each node of the node tree associated with a respective issuer entity; and incorporate the node tree within the hierarchically indexed multimedia database, such that the node tree is supported by the branch.

9. The computer system of claim 8, wherein the plurality of issuer entities comprises the issuer entity.

10. The computer system of claim 8, wherein mining the Internet for the multimedia content is performed using a machine learning model trained using features indicative of at least a particular industry of the plurality of industries, the plurality of branches including a particular branch associated with the particular industry.

11. The computer system of claim 8, wherein the computer instructions further cause the computer system to generate a graphical user interface displaying the branch associated with the industry excluded from the plurality of industries within the hierarchically indexed multimedia database in response to receiving a combinatorial query from an investor entity referencing the industry.

12. The computer system of claim 8, wherein the branch associated with the industry excluded from the plurality of industries is a first branch and the industry excluded from the plurality of industries is a first industry, wherein the computer instructions further cause the computer system to:
  determine that video or audio stored on the first branch mismatches the first industry; and
  transfer the video or audio to a second branch of the hierarchically indexed multimedia database, wherein the video or audio matches a second industry associated with the second branch.

13. The computer system of claim 8, wherein the branch associated with the industry excluded from the plurality of industries is a first branch and the industry excluded from the plurality of industries is a first industry, wherein the computer instructions further cause the computer system to:
  extract a pattern from a second branch of the hierarchically indexed multimedia database, the second branch associated with a second industry associated with the first industry,
  wherein generating the first branch and the node associated with the issuer entity is performed based on the pattern.

14. The computer system of claim 8, wherein the computer instructions further cause the computer system to:
  receive issuer profile questionnaires describing a plurality of issuer entities associated with the plurality of industries; and
  construct the hierarchically indexed multimedia database categorizing the plurality of industries based on the issuer profile questionnaires.

15. A non-transitory computer-readable storage medium storing computer instructions, which when executed by a computer processor cause the computer processor to:
  mine the Internet for multimedia content associated with a plurality of industries categorized by a hierarchically indexed multimedia database comprising a plurality of branches, each branch of the plurality of branches associated with a respective industry of the plurality of industries;
  cluster the multimedia content among a plurality of issuer entities associated with the hierarchically indexed multimedia database, wherein clustering the multimedia content comprises determining a relationship, from the multimedia content, between each issuer entity and each other issuer entity of the plurality of issuer entities;
  determine that the multimedia content is associated with an industry and an issuer entity, the industry excluded from the plurality of industries, the determining performed using machine learning based on the multimedia content;
  generate a branch associated with the industry excluded from the plurality of industries and a node associated with the issuer entity and supported by the branch;
  store the multimedia content at the node associated with the issuer entity;
  modify the hierarchically indexed multimedia database by incorporating the branch associated with the industry excluded from the plurality of industries within the hierarchically indexed multimedia database;
  generate a node tree structured in accordance with the relationship between each issuer entity and each other issuer entity of the plurality of issuer entities, each node of the node tree associated with a respective issuer entity; and
  incorporate the node tree within the hierarchically indexed multimedia database, such that the node tree is supported by the branch.

* * * * *